United States Patent
Navarrete Michelini et al.

(10) Patent No.: US 11,954,822 B2
(45) Date of Patent: Apr. 9, 2024

(54) IMAGE PROCESSING METHOD AND DEVICE, TRAINING METHOD OF NEURAL NETWORK, IMAGE PROCESSING METHOD BASED ON COMBINED NEURAL NETWORK MODEL, CONSTRUCTING METHOD OF COMBINED NEURAL NETWORK MODEL, NEURAL NETWORK PROCESSOR, AND STORAGE MEDIUM

(71) Applicant: BOE TECHNOLOGY GROUP CO., LTD., Beijing (CN)

(72) Inventors: Pablo Navarrete Michelini, Beijing (CN); Wenbin Chen, Beijing (CN); Hanwen Liu, Beijing (CN); Dan Zhu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 317 days.

(21) Appl. No.: 17/419,350

(22) PCT Filed: Oct. 13, 2020

(86) PCT No.: PCT/CN2020/120586
§ 371 (c)(1),
(2) Date: Jun. 29, 2021

(87) PCT Pub. No.: WO2021/073493
PCT Pub. Date: Apr. 22, 2021

(65) Prior Publication Data
US 2022/0084166 A1    Mar. 17, 2022

(30) Foreign Application Priority Data
Oct. 18, 2019  (CN) .......................... 201910995755.2

(51) Int. Cl.
*G06T 3/4046* (2024.01)
*G06N 3/08* (2023.01)
(Continued)

(52) U.S. Cl.
CPC ............. *G06T 3/4046* (2013.01); *G06N 3/08* (2013.01); *G06T 3/4053* (2013.01); *G06T 5/50* (2013.01)

(58) Field of Classification Search
None
See application file for complete search history.

(56) References Cited

U.S. PATENT DOCUMENTS

| 9,659,384 B2 | 5/2017 | Shaji et al. |
| 2012/0086850 A1* | 4/2012 | Irani ......................... G06T 3/40 348/E7.003 |

(Continued)

FOREIGN PATENT DOCUMENTS

| CN | 103810999 A | 5/2014 |
| CN | 106991506 A | 7/2017 |

(Continued)

OTHER PUBLICATIONS

Wei Ke, Jie Chen, Jianbin Jiao, Guoying Zhao, Qixiang Ye, "Side-output Residual Network for Object Reflection Symmetry Detection and Beyond", arXiv:1807.06621v1 [cs.CV] Jul. 17, 2018.*

(Continued)

*Primary Examiner* — Jiangeng Sun
(74) *Attorney, Agent, or Firm* — Chiwin Law LLC

(57) ABSTRACT

An image processing method, an image processing device, a training method of a neural network, an image processing method based on a combined neural network model, a constructing method of a combined neural network model, a neural network processor, and a storage medium are provided. The image processing method includes: obtaining, (Continued)

based on an input image, initial feature images of N stages with resolutions from high to low, where N is a positive integer and N>2, performing, based on initial feature images of second to N-th stages, cyclic scaling processing on an initial feature image of a first stage, to obtain an intermediate feature image; and preforming merging processing on the intermediate feature image to obtain an output image. The cyclic scaling processing includes hierarchically-nested scaling processing of N−1 stages, and scaling processing of each stage includes down-sampling processing, concatenating processing, up-sampling processing, and residual link addition processing.

16 Claims, 9 Drawing Sheets

(51) Int. Cl.
 *G06T 3/4053* (2024.01)
 *G06T 5/50* (2006.01)

(56) References Cited

U.S. PATENT DOCUMENTS

| | | | | |
|---|---|---|---|---|
| 2013/0071040 A1* | 3/2013 | Jin | .................. | G06T 3/4053 |
| | | | | 382/254 |
| 2016/0063677 A1* | 3/2016 | Deamo | ................ | G06T 3/4053 |
| | | | | 382/199 |

FOREIGN PATENT DOCUMENTS

| | | | |
|---|---|---|---|
| CN | 108537762 A | | 9/2018 |
| CN | 110018322 A | | 7/2019 |
| CN | 110188776 A | | 8/2019 |
| CN | 110223224 A | * | 9/2019 |
| CN | 110717851 A | | 1/2020 |

OTHER PUBLICATIONS

"Code from EDSR super-resolution algorithm," from https://github.com/sanghyun-son/EDSR-Pytouch; or from B. Lim et al "Enhanced Deep Residual Networks for Single Image Super Resolution," CVPRW 2017, 2nd NTIRE.
H. Chu, "Lightening Memory Mapped Database (LMDB)" from https://dbdb.io/db/lmdb; 2011; Ireland.
"MatLab Distinct block processing image" from www.mathworks.com/help/images/ref/brockproc.html.
S. Chan, "Image super-resolution via sparse representation," ECE/STAT 695 Spring 2018, Purdue University.
P. Navarrete Michelini et al., "Multi-Scale Recursive and Perception-Distortion Controllable Image Super-Resolution," arXiv:1809.10711v2 [eess.IV] Jan. 29, 2019.
A. Jolicoeur-Martineau, "The relativistic discriminator: a key element missing from standard GAN," arXiv:1807.00734v3 [cs.LG] Sep. 10, 2018.
R. Mechrez et al., "Maintaining Natural Image Statistics with the Contextual Loss," arXiv:1803.04626v3 [cs.CV] Jul. 18, 2018.
D. Povey et al., "Parallel training of DNNs with Natural Gradient and Parameter Averaging," from https://arXiv.org/abs/1410.7455v8 [cs.NE].

\* cited by examiner

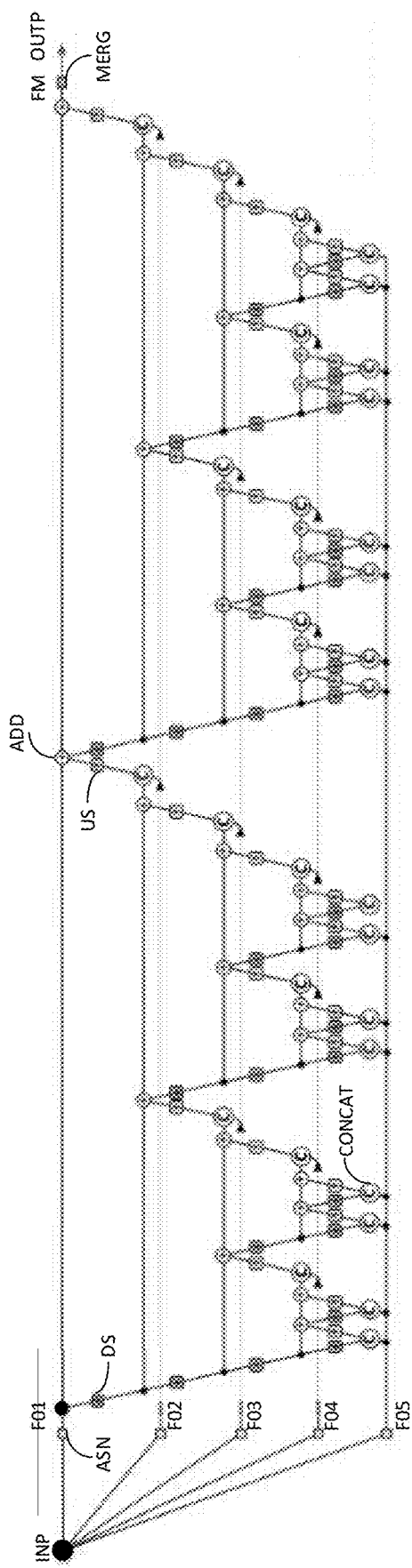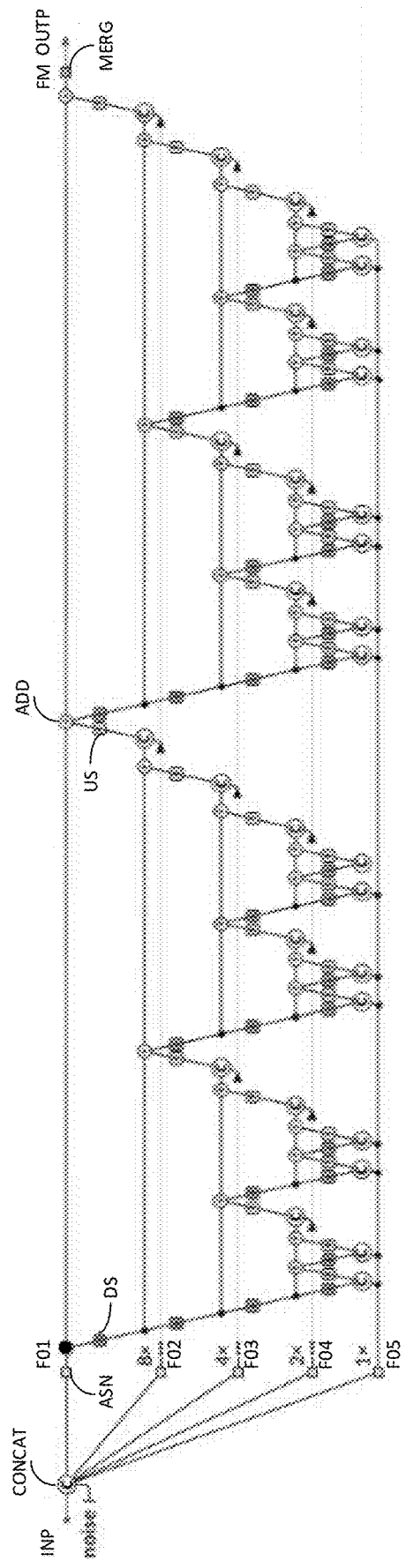
FIG. 3A
FIG. 3B

IMAGE PROCESSING METHOD AND DEVICE, TRAINING METHOD OF NEURAL NETWORK, IMAGE PROCESSING METHOD BASED ON COMBINED NEURAL NETWORK MODEL, CONSTRUCTING METHOD OF COMBINED NEURAL NETWORK MODEL, NEURAL NETWORK PROCESSOR, AND STORAGE MEDIUM

This application is a U.S. National Phase Entry of International Application No. PCT/CN2020/120586 filed on Oct. 13, 2020, designating the United States of America and claiming priority to Chinese Patent Application No. 201910995755.2, filed on Oct. 18, 2019. The present application claims priority to and the benefit of the above-identified applications and the above-identified applications are incorporated by reference herein in their entirety.

TECHNICAL FIELD

Embodiments of the present disclosure relate to an image processing method, an image processing device, a training method of a neural network, an image processing method based on a combined neural network model, a constructing method of a combined neural network model, a neural network processor, and a storage medium.

BACKGROUND

Currently, deep learning technology based on artificial neural networks has made great progress in fields such as image classification, image capture and search, facial recognition, age and voice recognition, etc. The advantage of deep learning lies in that it can solve extremely different technical problems with a relatively similar system by using a general architecture. A convolutional neural network (CNN) is a kind of artificial neural networks which has been developed in recent years and attracted wide attention. The CNN is a special method of image recognition, which is a highly effective network with forward feedback. At present, the application scope of the CNN is not only limited to the field of image recognition, but can also be applied to other application directions, such as face recognition, text recognition, image processing, etc.

SUMMARY

At least one embodiment of the present disclosure provides an image processing method, and the image processing method comprises: obtaining an input image; obtaining, based on the input image, initial feature images of N stages with resolutions from high to low, where N is a positive integer and N>2; performing, based on initial feature images of second to N-th stages, cyclic scaling processing on an initial feature image of a first stage, to obtain an intermediate feature image; and performing merging processing on the intermediate feature image to obtain an output image, where the cyclic scaling processing comprises hierarchically-nested scaling processing of N−1 stages, and scaling processing of each stage comprises down-sampling processing, concatenating processing, up-sampling processing, and residual link addition processing; down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, ..., N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, where j=1, 2, ..., N−2.

For example, the concatenating processing of the i-th stage performing, based on the down-sampling output of the i-th stage and the initial feature image of the (i+1)-th stage, concatenating to obtain the concatenating output of the i-th stage, comprises: taking the down-sampling output of the i-th stage as an input of scaling processing of the (i+1)-th stage, to obtain an output of the scaling processing of the (i+1)-th stage; and concatenating the output of the scaling processing of the (i+1)-th stage with the initial feature image of the (i+1)-th stage to obtain the concatenating output of the i-th stage.

For example, scaling processing of at least one stage is continuously performed a plurality of times, and an output of a former scaling processing serves as an input of a latter scaling processing.

For example, the scaling processing of each stage is continuously performed twice.

For example, among the initial feature images of the N stages, resolution of the initial feature image of the first stage is provided with a highest value, and the resolution of the initial feature image of the first stage is identical to resolution of the input image.

For example, resolution of an initial feature image of a former stage is an integer multiple of resolution of an initial feature image of a latter stage.

For example, obtaining, based on the input image, the initial feature images of the N stages with resolutions from high to low, comprises: concatenating the input image with a random noise image to obtain a concatenating input image; and performing analysis processing of N different stages on the concatenating input image, to obtain the initial feature images of the N stages with resolutions from high to low, respectively.

For example, obtaining the input image comprises: obtaining an original input image with first resolution; and performing resolution conversion processing on the original input image to obtain the input image with second resolution, where the second resolution is greater than the first resolution.

For example, the resolution conversion processing is performed by using one selected from a group consisting of a bicubic interpolation algorithm, a bilinear interpolation algorithm, and a Lanczos interpolation algorithm.

For example, the image processing method further comprises: performing crop processing on the input image to obtain a plurality of sub-input images with an overlapping region; obtaining, based on the input image, the initial feature images of the N stages with resolutions from high to low, comprises: obtaining, based on each of the sub-input images, sub-initial feature images of N stages with resolutions from high to low, where N is a positive integer and N>2; performing, based on the initial feature images of the second to N-th stages, the cyclic scaling processing on the initial feature image of the first stage to obtain the intermediate feature image, comprises: performing, based on sub-initial feature images of second to N-th stages, cyclic scaling processing on a sub-initial feature image of a first stage, to obtain a sub-intermediate feature image; and performing the merging processing on the intermediate feature image to obtain the output image, comprises: performing merging processing on the sub-intermediate feature image to obtain a corresponding sub-output image, and stitching sub-output images corresponding to the plurality of sub-input images into the output image.

For example, the plurality of sub-input images are identical in size, centers of the plurality of sub-input images form a uniform and regular grid, an overlapping region of two adjacent sub-input images is provided with a constant size in both a row direction and a column direction, and a pixel value of each pixel point in the output image is expressed as:

$$Y_p = \frac{1}{\sum_{k=1}^{T} s_k} \sum_{k=1}^{T} s_k Y_{k,(p)},$$

where $Y_p$ represents a pixel value of any pixel point p in the output image, T represents a count of sub-output images comprising the pixel point p, $Y_{k,(p)}$ represents a pixel value of the pixel point p in a k-th sub-output image comprising the pixel point p, and $S_k$ represents a distance between the pixel point p in the k-th sub-output image comprising the pixel point p, and a center of the k-th sub-output image comprising the pixel point p.

At least one embodiment of the present disclosure further provides an image processing method based on a combined neural network model; the combined neural network model comprises a plurality of neural network models, the plurality of neural network models are configured to execute an identical image processing task, input images of the plurality of neural network models are provided with identical resolution, output images of the plurality of neural network models are provided with identical resolution, and any two of the plurality of neural network models are different in at least one of a structure or a parameter; and the image processing method based on the combined neural network model comprises: inputting an input image into the plurality of neural network models in the combined neural network model, to obtain outputs of the plurality of neural network models, respectively; and averaging the outputs of the plurality of neural network models to obtain an output of the combined neural network model.

For example, the plurality of neural network models comprise a first neural network model, the first neural network model is configured to perform a first image processing method, and the first image processing method comprises: obtaining an input image; obtaining, based on the input image, initial feature images of N stages with resolutions from high to low, where N is a positive integer and N>2; performing, based on initial feature images of second to N-th stages, cyclic scaling processing on an initial feature image of a first stage, to obtain an intermediate feature image; and performing merging processing on the intermediate feature image to obtain an output image; the cyclic scaling processing comprises hierarchically-nested scaling processing of N−1 stages, and scaling processing of each stage comprises down-sampling processing, concatenating processing, up-sampling processing, and residual link addition processing; down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, . . . , N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, where j=1, 2, . . . , N−2.

At least one embodiment of the present disclosure further provides a training method of a neural network, the neural network comprises an analysis network, a cyclic scaling network, and a merging network, and the training method comprises: obtaining a first training input image; processing, by using the analysis network, the first training input image, to obtain training initial feature images of N stages with resolutions from high to low, where N is a positive integer and N>2; performing, by using the cyclic scaling network and based on training initial feature images of second to N-th stages, cyclic scaling processing on a training initial feature image of a first stage, to obtain a training intermediate feature image; performing, by using the merging network, merging processing on the training intermediate feature image to obtain a first training output image; calculating, based on the first training output image, a loss value of the neural network through a loss function; and modifying a parameter of the neural network according to the loss value of the neural network; the cyclic scaling processing comprises hierarchically-nested scaling processing of N−1 stages, and scaling processing of each stage comprises down-sampling processing, concatenating processing, up-sampling processing, and residual link addition processing which are sequentially performed; down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, . . . , N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, where j=1, 2, . . . , N−2.

For example, the loss function is expressed as:

$$L(Y, X) = \sum_{k=1}^{N} E[|S_{k-1}(Y) - S_{k-1}(X)|],$$

where L(Y, X) represents the loss function, Y represents the first training output image, X represents a first training standard image corresponding to the first training input image, $S_{k-1}(Y)$ represents an output obtained by performing down-sampling processing of a (k−1)-th stage on the first training output image, $S_{k-1}(X)$ represents an output obtained by performing the down-sampling processing of the (k−1)-th stage on the first training standard image, and E[ ] represents calculation of matrix energy.

For example, processing, by using the analysis network, the first training input image to obtain the training initial feature images of the N stages with resolutions from high to low, comprises: concatenating the first training input image with a random noise image to obtain a training concatenating input image; and performing, by using the analysis network, analysis processing of N different stages on the training concatenating input image, to obtain the training initial feature images of the N stages with resolutions from high to low, respectively.

For example, calculating, based on the first training output image, the loss value of the neural network through the loss function, comprises: processing the first training output image by using a discriminative network, and calculating the loss value of the neural network based on an output of the discriminative network corresponding to the first training output image.

For example, the discriminative network comprises: down-sampling sub-networks of M−1 stages, discriminative sub-networks of M stages, a merging sub-network, and an activation layer; the down-sampling sub-networks of the M−1 stages are configured to perform down-sampling processing of different stages on an input of the discriminative network, so as to obtain outputs of the down-sampling sub-networks of the M−1 stages; the input of the discriminative network and the outputs of the down-sampling sub-networks of the M−1 stages serve as inputs of the discriminative sub-networks of the M stages, respectively; the discriminative sub-network of each stage comprises a brightness processing sub-network, a first convolution sub-network, and a second convolution sub-network which are sequentially connected; an output of a second convolution sub-network in a discriminative sub-network of a t-th stage and an output of a first convolution sub-network in a discriminative sub-network of a (t+1)-th stage are concatenated as an input of a second convolution sub-network in the discriminative sub-network of the (t+1)-th stage, where t=1, 2, . . . , M−1; the merging sub-network is configured to perform merging processing on an output of a second convolution sub-network in a discriminative sub-network of an M-th stage, to obtain a discriminative output image; and the activation layer is configured to process the discriminative output image to obtain a value indicating quality of the input of the discriminative network.

For example, the brightness processing sub-network comprises a brightness feature extraction sub-network, a normalization sub-network, and a translation correlation sub-network; the brightness feature extraction sub-network is configured to extract a brightness feature image, the normalization sub-network is configured to perform normalization processing on the brightness feature image to obtain a normalized brightness feature image, and the translation correlation sub-network is configured to perform multiple image translation processing on the normalized brightness feature image to obtain a plurality of shift images, and is configured to generate a plurality of correlation images according to correlation between the normalized brightness feature image and each of the shift images.

For example, the loss function is expressed as:

$$L(Y,X)=\lambda_1 L_G(Y_{W=1})+\lambda_2 L_{L1}(S_M(Y_{W=1}),S_M(X))+\lambda_3 L_{cont}(Y_{W=1},X)+\lambda_4 L_{L1}(Y_{W=0},X)+\lambda_5 L_{L1}(S_M(Y_{W=0}),S_M(X)),$$

where L(Y, X) represents the loss function, Y represents the first training output image, Y comprises $Y_{W=1}$ and $Y_{W=0}$, X represents a first training standard image corresponding to the first training input image, $L_G(Y_{W=1})$ represents a generative loss function, $Y_{W=1}$ represents a first training output image obtained in a case where a noise amplitude of the random noise image is not zero, $L_{L1}(S_M(Y_{W=1}), S_M(X))$ represents a first contrast loss function, $L_{cont}(Y_{W=1}, X)$ represents a content loss function, $L_{L1}((Y_{W=0}), X)$ represents a second contrast loss function, $Y_{W=0}$ represents a first training output image obtained in a case where the noise amplitude of the random noise image is zero, $L_{L1}(S_M(Y_{W=0}), S_M(X))$ represents a third contrast loss function, $S_M(\ )$ represents performing down-sampling processing of an M-th stage, and $\lambda_1$, $\lambda_2$, $\lambda_3$, $\lambda_4$, and $\lambda_5$ represent preset weight values, respectively; the generative loss function $L_G(Y_{W=1})$ is expressed as:

$$L_G(Y_{W=1})=-E[\log(\text{Sigmoid}(C(Y_{W=1})-C(X)))],$$

where $C(Y_{W=1})$ represents a discriminative output image obtained in the case where the noise amplitude of the random noise image is not zero, and C(X) represents a discriminative output image obtained by taking the first training standard image as the input of the discriminative network; the first contrast loss function $L_{L1}(S_M(Y_{W=1}), S_M(X))$, the second contrast loss function $L_1((Y_{W=0}), X)$, and the third contrast loss function $L_{L1}(S_M(Y_{W=0}), S_M(X))$ are respectively expressed as:

$$\begin{cases} L_{L1}(S_M(Y_{W=1}), S_M(X)) = E[|S_M(Y_{W=1}) - S_M(X)|] \\ L_{L1}(Y_{W=0}, X) = E[|Y_{W=0} - X|] \\ L_{L1}(S_M(Y_{W=0}), S_M(X)) = E[|S_M(Y_{W=0}) - S_M(X)|] \end{cases},$$

where E[ ] represents calculation of matrix energy; the content loss function $L_{cont}(Y_{W=1}, X)$ is expressed as:

$$L_{cont}(Y_{W=1}, X) = \frac{1}{2S_1}\sum_{ij}(F_{ij} - P_{ij}),$$

where S1 is a constant, $F_{ij}$ represents a value of a j-th position in a first content feature image of a first training output image extracted by an i-th convolution kernel in a content feature extraction module, and $P_{ij}$ represents a value of a j-th position in a second content feature image of a first training standard image extracted by the i-th convolution kernel in the content feature extraction module.

For example, the training method of the neural network further comprises: training the discriminative network based on the neural network; and alternately performing a training process of the discriminative network and a training process of the neural network to obtain a trained neural network; training the discriminative network based on the neural network, comprises: obtaining a second training input image; processing, by using the neural network, the second training input image to obtain a second training output image; calculating, based on the second training output image, a discriminative loss value through a discriminative loss function; and modifying a parameter of the discriminative network according to the discriminative loss value.

For example, the discriminative loss function is expressed as:

$$L_D(V_{W=1}) = -E[\log(\text{Sigmoid}(C(U)-C(V_{W=1})))],$$

where $L_D(V_{W=1})$ represents the discriminative loss function, U represents a second training standard image corresponding to the second training input image, $V_{W=1}$ represents a second training output image obtained in a case where a noise amplitude of the random noise image is not zero, C(U) represents a discriminative output image obtained by taking the second training standard image as the input of the discriminative network, and $C(V_{W=1})$ represents a discriminative output image obtained in the case where the noise amplitude of the random noise image is not zero.

For example, the training method of the neural network further comprises: previous to training, performing crop processing and decode processing on each sample image in a training set, to obtain a plurality of sub-sample images in binary data format; and during training, training the neural network based on the plurality of sub-sample images in the binary data format.

For example, the plurality of sub-sample images are identical in size.

At least one embodiment of the present disclosure further provides a constructing method of a combined neural network model, and the constructing method of a combined neural network model comprises: obtaining a plurality of trained neural network models; the plurality of neural network models are configured to execute an identical image processing task, input images of the plurality of neural network models are provided with identical resolution, output images of the plurality of neural network models are provided with identical resolution, and any two of the plurality of neural network models are different in at least one of a structure or a parameter; obtaining outputs of the plurality of neural network models based on an identical verification set, determining evaluation quality of the plurality of neural network models according to a predetermined image quality evaluation criterion, and sorting the plurality of neural network models according to the evaluation quality from high to low; taking a neural network model with highest evaluation quality as a first neural network model in the combined neural network model; and determining whether a neural network model with highest evaluation quality among remaining neural network models can be added into a current combined neural network model, if yes, adding the neural network model with the highest evaluation quality among the remaining neural network models into the current combined neural network model, and if not, taking the current combined neural network model as an obtained combined neural network model.

For example, the constructing method of a combined neural network model further comprises: training the obtained combined neural network model to obtain a trained combined neural network model.

For example, the predetermined image quality evaluation criterion comprises one selected from a group consisting of a mean square error, similarity, and a peak signal-to-noise ratio.

For example, the plurality of neural network models comprise a first neural network model, the first neural network model is configured to perform a first image processing method, and the first image processing method comprises: obtaining an input image; obtaining, based on the input image, initial feature images of N stages with resolutions from high to low, where N is a positive integer and N>2; performing, based on initial feature images of second to N-th stages, cyclic scaling processing on an initial feature image of a first stage among the initial feature images of the N stages, to obtain an intermediate feature image; and performing merging processing on the intermediate feature image to obtain an output image; the cyclic scaling processing comprises hierarchically-nested scaling processing of N−1 stages, and scaling processing of each stage comprises down-sampling processing, concatenating processing, up-sampling processing, and residual link addition processing; down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, . . . , N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, where j=1, 2, . . . , N−2.

At least one embodiment of the present disclosure further provides a neural network processor, and the neural network processor comprises an analysis circuit, a cyclic scaling circuit, and a merging circuit; the analysis circuit is configured to obtain, based on an input image, initial feature images of N stages with resolutions from high to low, where N is a positive integer and N>2; the cyclic scaling circuit is configured to perform, based on initial feature images of second to N-th stages, cyclic scaling processing on an initial feature image of a first stage, to obtain an intermediate feature image; the merging circuit is configured to perform merging processing on the intermediate feature image to obtain an output image; the cyclic scaling circuit comprises hierarchically-nested scaling circuits of N−1 stages, and the scaling circuit of each stage comprises a down-sampling circuit, a concatenating circuit, an up-sampling circuit, and a residual link addition circuit; a down-sampling circuit of an i-th stage performs, based on an input of a scaling circuit of the i-th stage, down-sampling to obtain a down-sampling output of the i-th stage, a concatenating circuit of the i-th stage performs, based on the down-sampling output of the i-th stage and an initial feature image of an (i+1)-th stage, concatenating to obtain a concatenating output of the i-th stage, an up-sampling circuit of the i-th stage obtains an up-sampling output of the i-th stage based on the concatenating output of the i-th stage, and a residual link addition circuit of the i-th stage performs residual link addition between the input of the scaling circuit of the i-th stage and the up-sampling output of the i-th stage, to obtain an output of the scaling circuit of the i-th stage, where i=1, 2, . . . , N−1; and a scaling circuit of a (j+1)-th stage is nested between a down-sampling circuit of a j-th stage and a concatenating circuit of the j-th stage, and an output of the down-sampling circuit of the j-th stage serves as an input of the scaling circuit of the (j+1)-th stage, where j=1, 2, . . . , N−2.

At least one embodiment of the present disclosure further provides an image processing device, and the image processing device comprises: an image obtaining module, configured to obtain an input image; and an image processing module, configured to: obtain, based on the input image, initial feature images of N stages with resolutions from high to low, where N is a positive integer and N>2; perform, based on initial feature images of second to N-th stages, cyclic scaling processing on an initial feature image of a first stage, to obtain an intermediate feature image; and perform merging processing on the intermediate feature image to obtain an output image; the cyclic scaling processing comprises hierarchically-nested scaling processing of N−1 stages, and scaling processing of each stage comprises down-sampling processing, concatenating processing, up-sampling processing, and residual link addition processing; down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, . . . , N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, where j=1, 2, . . . , N−2.

At least one embodiment of the present disclosure further provides an image processing device, and the image processing device comprises: a memory, configured for non-transitory storage of computer readable instructions; and a processor, configured to execute the computer readable instructions; and upon the computer readable instructions being executed by the processor, the image processing method provided by any one of the embodiments of the present disclosure is executed, or the image processing method based on the combined neural network model provided by any one of the embodiments of the present disclosure is executed, or the training method of the neural network provided by any one of the embodiments of the present disclosure is executed, or the constructing method of the combined neural network model provided by any one of the embodiments of the present disclosure is executed.

At least one embodiment of the present disclosure further provides a storage medium, the storage medium is configured for non-transitory storage of computer readable instructions, and upon the computer readable instructions being executed by a computer, instructions of the image processing method provided by any one of the embodiments of the present disclosure can be executed, or instructions of the image processing method based on the combined neural network model provided by any one of the embodiments of the present disclosure can be executed, or instructions of the training method of the neural network provided by any one of the embodiments of the present disclosure can be executed, or instructions of the constructing method of the combined neural network model provided by any one of the embodiments of the present disclosure can be executed.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

FIG. 3A is an exemplary flowchart corresponding to the image processing method illustrated in FIG. 2 provided by some embodiments of the present disclosure;

FIG. 3B is an exemplary flowchart corresponding to the image processing method illustrated in FIG. 2 provided by some other embodiments of the present disclosure;

DETAILED DESCRIPTION

Figure 1A:
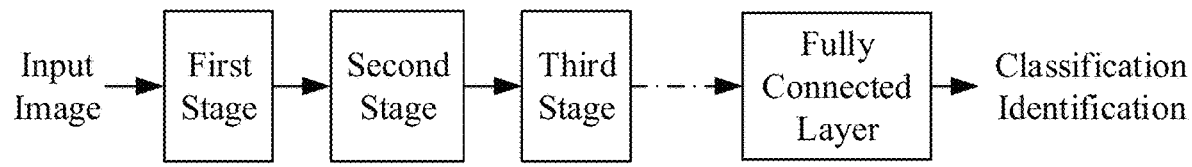
FIG. 1A is a schematic structural diagram of a convolutional neural network.

In order to make objects, technical details and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left," and the like are only used to indicate relative position relationship, and when the position of the object which is described is changed, the relative position relationship may be changed accordingly.

The present disclosure is described below with reference to some specific embodiments. In order to keep the following description of the embodiments of the present disclosure clear and concise, detailed descriptions of known functions and known components may be omitted. When any one component of an embodiment of the present disclosure appears in more than one of the accompanying drawings, the component is denoted by the same or similar reference numeral in each of the drawings.

Image enhancement is one of research hotspots in the field of image processing. Due to limitations of various physical factors (for instance, the size of the image sensor of a mobile phone camera being too small, limitations of other software and hardware of the mobile phone camera, etc.) and interference of environmental noise, the quality of an image is greatly degraded. The purpose of image enhancement is to improve a grayscale histogram of the image and increase the contrast of the image via image enhancement technology, so as to highlight details of the image and improve a visual effect of the image.

Initially, a convolutional neural network (CNN) is primarily used to identify two-dimensional shapes, and it is highly invariant to the shifting, scaling, tilting, or other forms of deformation of images. The CNN mainly simplifies the complexity of the neural network and reduces the number of weights through the local receptive field and weight sharing. With the development of deep learning technology, the application scope of the CNN is not only limited to the field of image recognition, but can also be applied in the fields of face recognition, text recognition, animal classification, image processing, etc.

The convolutional neural network can be used for image processing, which uses images as input and output, and replaces scalar weights by convolution kernels. For example, the convolutional neural network may have a 3-layered structure. The convolutional neural network may include an input layer, a hidden layer, and an output layer. The input layer may have four inputs, the hidden layer may have three outputs, the output layer may have two outputs, and the convolutional neural network finally outputs two images.

For example, the four inputs of the input layer may be four images or four feature images of one image. The three outputs of the hidden layer may be feature images of images input through the input layer.

For example, the convolutional layer has a weight and a bias. The weight represents a convolution kernel, and the bias is a scalar superimposed on the output of the convolutional layer. For example, a first convolutional layer includes a first set of convolution kernels and a first set of biases. A second convolutional layer includes a second set of convolution kernels and a second set of biases. In general, each convolutional layer includes dozens or hundreds of convolution kernels. If being a deep convolutional neural network, the convolutional neural network may include at least five convolutional layers.

For example, the convolutional neural network further includes a first activation layer and a second activation layer. The first activation layer is provided after the first convolutional layer, and the second activation layer is provided after the second convolutional layer. The activation layer (for instance, the first activation layer and the second activation layer) includes an activation function. The activation function is used to introduce nonlinear factors into the convolutional neural network, so that the convolutional neural network can solve complex problems better. The activation function may include a rectified linear unit (ReLU) function, a sigmoid function, a hyperbolic tangent function (a tanh function), or the like. The ReLU function is an unsaturated nonlinear function, and the sigmoid function and the tanh function are saturated nonlinear functions. For instance, the activation layer can be used alone as one layer of the convolutional neural network, or the activation layer can also be included in a convolutional layer (for instance, the first convolutional layer may include the first activation layer, and the second convolutional layer may include the second activation layer).

For example, in the first convolutional layer, firstly, the output of the first convolutional layer is obtained by applying a plurality of convolution kernels in the first set of convolution kernels and a plurality of biases in the first set of biases to each input; and then, the output of the first convolutional layer can be processed by the first activation layer, so as to obtain the output of the first activation layer. In the second convolutional layer, firstly, the output of the second convolutional layer is obtained by applying a plurality of convolution kernels in the second set of convolution kernels and a plurality of biases in the second set of biases to the output of the first activation layer being input; and then, the output of the second convolutional layer can be processed by the second activation layer, so as to obtain the output of the second activation layer. For instance, the output of the first convolutional layer may be a result of applying the convolution kernels to the input of the first convolutional layer and then adding the biases, and the output of the second convolutional layer may be a result of applying the convolution kernels to the output of the first activation layer and then adding the biases.

The convolutional neural network needs to be trained before being used for image processing. After being trained, the convolution kernels and the biases of the CNNs remain unchanged during image processing. In the training process, the convolution kernels and the biases are adjusted by using multiple sets of input/output sample images and optimization algorithms, so as to obtain an optimized CNN.

Figure 1B:
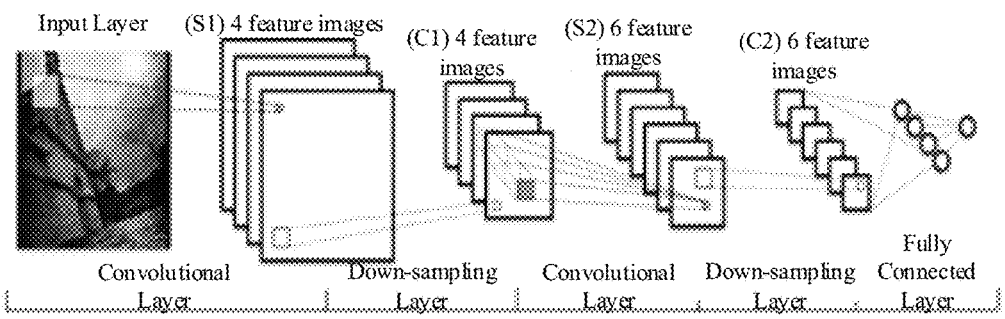
FIG. 1B is a schematic diagram illustrating a working process of a convolutional neural network.

FIG. 1A is a schematic structural diagram of a convolutional neural network, and FIG. 1B is a schematic diagram illustrating a working process of a convolutional neural network. For instance, as illustrated in FIG. 1A and FIG. 1B, after an input image is input to the convolutional neural network through an input layer, the classification identification is output after several processing procedures (e.g., each stage in FIG. 1A). The convolutional neural network may mainly include multiple convolutional layers, multiple down-sampling layers, a fully connected layer, etc. In the present disclosure, it should be understood that each of these layers, such as the multiple convolutional layers, the multiple down-sampling layers, and the fully connected layer, refers to a corresponding processing operation, i.e., convolution processing, down-sampling processing, fully connected processing, etc. The described neural network also refers to corresponding processing operations, and the instance normalization layer or layer normalization layer which will be described below is similar to this case, which is not described herein again. For instance, a complete convolutional neural network may be formed by a superimposition of these three kinds of layers. For instance, FIG. 1A only shows three stages of the convolutional neural network, that is, the first stage, the second stage, and the third stage. For instance, each stage may include one convolution module and one down-sampling layer. For instance, each convolution module may include a convolutional layer. Thus, the processing procedure of each stage may include performing convolution and down-sampling (or sub-sampling) on the input image. For instance, according to actual demands, each convolution module may further include an instance normalization layer or a layer normalization layer, so that the processing procedure of each stage may further include instance normalization processing or layer normalization processing.

For example, the instance normalization layer is used to perform instance normalization processing on the feature image output by the convolutional layer, so as to allow the grayscale values of pixels of the feature image to be changed within a predetermined range, thereby simplifying the image generation process and improving the image enhancement effect. For instance, the predetermined range may be [−1, 1] or the like. According to the mean value and variance of each feature image, the instance normalization layer performs instance normalization processing on the feature image. For instance, the instance normalization layer can also be used to perform instance normalization processing on a single image.

For example, assuming that a size of a mini-batch gradient decent method is T, the number of feature images output by a convolutional layer is C, and each feature image is a matrix of H rows and W columns, the model of feature images is expressed as (T, C, H, W). Therefore, the instance normalization formula of the instance normalization layer can be expressed as:

$$y_{tijk} = \frac{x_{tijk} - \mu_{ti}}{\sqrt{\sigma_{ti}^2 + \varepsilon_1}}, \mu_{ti} = \frac{1}{HW}\sum_{l=1}^{H}\sum_{m=1}^{W}x_{tilm}, \sigma_{ti}^2 = \frac{1}{HW}\sum_{l=1}^{H}\sum_{m=1}^{W}(x_{tilm} - l\mu_{ti})^2,$$

where $x_{tijk}$ is a value corresponding to the t-th feature patch, the i-th feature image, the j-th row, and the k-th column in the set of feature images output by the convolutional layer, $y_{tijk}$ represents the result obtained after $x_{tijk}$ being processed by the instance normalization layer, and $\varepsilon_1$ is a quite small positive number, so as to avoid the denominator being zero.

For example, similar to the instance normalization layer, the layer normalization layer is also used to perform layer normalization processing on the feature image output by the convolutional layer, so as to allow the grayscale values of pixels of the feature image to be changed within a predetermined range, thereby simplifying the image generation process and improving the image enhancement effect. For instance, the predetermined range may be [−1, 1]. Different from the instance normalization layer, the layer normalization layer performs layer normalization processing on each column of the feature image according to the mean value and variance of each column of the feature image, thus realizing the layer normalization processing on the feature image. For example, the layer normalization layer can also be used to perform layer normalization processing on a single image.

For example, still taking the mini-batch gradient decent method as an example, the model of feature images is expressed as (T, C, H, W). Therefore, the layer normalization formula of the layer normalization layer can be expressed as:

$$y'_{tijk} = \frac{x_{tijk} - \mu_{tik}}{\sqrt{\sigma_{tik}^2 + \varepsilon_2}}, \mu_{tik} = \frac{1}{H}\sum_{l=1}^{H}x_{tilk}, \sigma_{tik}^2 = \frac{1}{H}\sum_{l=1}^{H}(x_{tilk} - l\mu_{tik})^2,$$

where $x_{tijk}$ is a value corresponding to the t-th feature patch, the i-th feature image, the j-th row, and the k-th column in the set of feature images output by the convolutional layer, $y'_{tijk}$ represents the result obtained after $x_{tijk}$ being processed by the layer normalization layer, and $\varepsilon_2$ is a quite small positive number, so as to avoid the denominator being zero.

The convolutional layer is the core layer of the convolutional neural network. In the convolutional layer of the convolutional neural network, one neuron is only connected to some neurons of an adjacent layer. The convolutional layer can apply several convolution kernels (also referred to as filters) to the input image, so as to extract multiple types of features of the input image. Each convolution kernel can extract one type of feature. Convolution kernels are generally initialized in the form of a random fractional matrix. During the training process of the convolutional neural network, the convolution kernels may obtain reasonable weights through learning. The result obtained by applying a convolution kernel to the input image is referred to as a feature image or a feature map, and the number of feature images is equal to the number of convolution kernels. Each feature image is formed of some neurons arranged in a matrix, the neurons of the same feature image share weights, and the weights being shared here are convolution kernels. The feature image output by the convolutional layer of one stage can be input to the adjacent convolutional layer of the next stage and then can be processed again to obtain a new feature image. For instance, as illustrated in FIG. 1A, the convolutional layer of the first stage can output a feature image of the first stage, and the feature image of the first stage is input to the convolutional layer of the second stage and is processed again to obtain a feature image of the second stage.

For example, as illustrated in FIG. 1B, the convolutional layer can perform convolution on data of a certain local receptive field of the input image by using different convolution kernels, the convolution result is input to the activation layer, and the activation layer performs computing according to a corresponding activation function, so as to obtain feature information of the input image.

For example, as illustrated in FIG. 1A and FIG. 1B, the down-sampling layer is provided between adjacent convolutional layers, and the down-sampling layer is one form of down-sampling. In one aspect, the down-sampling layer can be used to reduce the size of the input image, simplify the computing complexity, and attenuate the over-fitting phenomenon to a certain extent. In another aspect, the down-sampling layer can also perform feature compression to extract main features of the input image. The down-sampling layer can reduce the size of the feature image, but does not change the number of feature images. For instance, if an input image with a size of 12×12 is sampled by a 6×6 convolution kernel, an output image with a size of 2×2 can be obtained, which means that 36 pixels of the input image are combined into one pixel in the output image. The final down-sampling layer or convolutional layer may be connected to one or more fully connected layers, and the fully connected layer is used for connecting all the extracted features. The output of the fully connected layer may be a one-dimensional matrix, i.e., a vector.

At least one embodiment of the present disclosure provides an image processing method. The image processing method includes: obtaining an input image; obtaining, based on the input image, initial feature images of N stages with resolutions from high to low, where N is a positive integer, N>2, and resolution of an initial feature image of a first stage which is provided with a highest resolution value is identical to resolution of the input image; performing, based on initial feature images of second to N-th stages, cyclic scaling processing on the initial feature image of the first stage, to obtain an intermediate feature image, where resolution of the intermediate feature image is identical to the resolution of the input image; and performing merging processing on the intermediate feature image to obtain an output image. The cyclic scaling processing includes hierarchically-nested scaling processing of N−1 stages, and scaling processing of each stage includes down-sampling processing, concatenating processing, up-sampling processing, and residual link addition processing; down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, . . . , N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, where j=1, 2, . . . , N−2.

Some embodiments of the present disclosure further provide an image processing device, a training method of a neural network, an image processing method based on a combined neural network model, a constructing method of a combined neural network model, and a storage medium, which correspond to the image processing method described above.

The image processing method provided by at least one embodiment of the present disclosure obtains, based on the input image, initial feature images with different resolutions, and performs cyclic scaling processing on the initial feature image with the highest resolution in combination with the initial feature images with different resolutions, which can obtain high image fidelity and greatly improve the quality of the output image, and further can improve the processing speed.

Hereinafter, some embodiments of the present disclosure and examples thereof will be described in detail with reference to the accompanying drawings.

Figure 2:
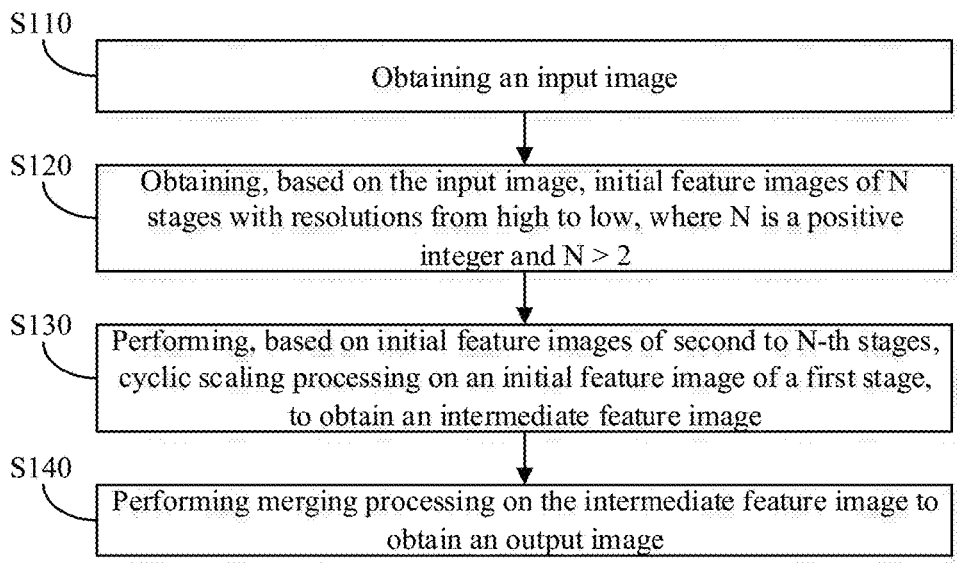
FIG. 2 is a flowchart of an image processing method provided by some embodiments of the present disclosure.

FIG. 2 is a flowchart of an image processing method provided by some embodiments of the present disclosure, FIG. 3A is an exemplary flowchart corresponding to the image processing method illustrated in FIG. 2 provided by some embodiments of the present disclosure, and FIG. 3B is an exemplary flowchart corresponding to the image processing method illustrated in FIG. 2 provided by some other embodiments of the present disclosure. Hereinafter, the image processing method illustrated in FIG. 2 will be described in detail with reference to FIG. 3A and FIG. 3B.

For example, as illustrated in FIG. 2, the image processing method includes steps S110 to S140.

Step S110: obtaining an input image.

For example, as illustrated in FIG. 3A and FIG. 3B, the input image is indicated as INP.

For example, the input image INP may include a photo taken and acquired by a camera of a smart phone, a camera of a tablet computer, a camera of a personal computer, a lens of a digital camera, a surveillance camera, a network camera, etc., and the input image may include a person image, an animal/plant image, a landscape image, etc. The embodiments of the present disclosure are not limited in this aspect.

For example, the input image INP may be a grayscale image, and may also be a color image. For instance, the input image may include but is not limited to an RGB image including 3 channels. It should be noted that in the embodiments of the present disclosure, in the case where the input image INP is a grayscale image, the output image OUTP is also a grayscale image; and in the case where the input image INP is a color image, the output image OUTP is also a color image.

For example, in some embodiments, the input image is obtained by obtaining an original input image with the first resolution and performing resolution conversion processing (e.g., image super-resolution reconstruction processing) on the original input image. For example, in some embodiments, the input image has the second resolution, and the second resolution is greater than the first resolution. The image super-resolution reconstruction is a technology to improve the resolution of the image, so as to obtain an image with higher resolution. In the common implementation of the image super-resolution reconstruction technology, a super-resolution image is usually generated by the interpolation algorithm. For instance, commonly used interpolation algorithms include nearest neighbor interpolation, bilinear interpolation, bicubic interpolation, Lanczos interpolation, etc. By using one of the above interpolation algorithms, a plurality of pixels can be generated based on one pixel in the original input image, so as to obtain a super-resolution input image based on the original input image. In other words, the image processing method provided by the embodiments of the present disclosure can perform enhancement processing on the super-resolution image generated by the conventional methods, thereby improving the quality of the super-resolution image.

Step S120: obtaining, based on the input image, initial feature images of N stages with resolutions from high to low, where N is a positive integer and N>2.

For example, in some embodiments, as illustrated in FIG. 3A, an analysis network can be used to perform analysis processing of N different stages on the input image INP, so as to obtain initial feature images F01~F0N (e.g., F01~F05 shown in FIG. 3A) of N stages with resolutions from high to low, respectively. For example, as illustrated in FIG. 3A, the analysis network includes N analysis sub-networks ASN, and the analysis sub-networks ASN are configured to respectively perform the analysis processing of different stages, so as to obtain the initial feature images F01~F0N (e.g., F01~F05 shown in FIG. 3A) of the N stages with resolutions from high to low, respectively. For example, each analysis sub-network ASN can be implemented as a convolutional network module, which includes a convolutional neural network (CNN), a residual network (ResNet), a dense network (DenseNet), etc. For instance, each analysis sub-network ASN may include a convolutional layer, a down-sampling layer, a normalization layer, etc., but is not limited to this case.

For instance, in some embodiments, as illustrated in FIG. 3B, the input image INP can be concatenated (as illustrated by CONCAT in the figure) with a random noise image NOISE to obtain a concatenating input image. Then, the analysis network can be used to perform analysis processing of N different stages on the concatenating input image, so as to obtain initial feature images F01~F0N of N stages with resolutions from high to low, respectively. For example, the concatenating processing CONCAT may be regarded as stacking each channel image of a plurality of (e.g., two or more) images to be concatenated, so that the number of channels of the images obtained through concatenating is the sum of the number of channels of the plurality of images to be concatenated. For instance, the channel image of the concatenating input image is the synthesis of the channel image of the input image and the channel image of the random noise image. For instance, the random noise in the random noise image NOISE can conform to Gaussian distribution, but is not limited thereto. For instance, the specific procedure and details of the analysis processing in the embodiment illustrated in FIG. 3B may refer to the related description of the analysis processing in the embodiment illustrated in FIG. 3A, and details are not described herein again.

It should be noted that during the image enhancement processing, the detailed features (e.g., hair, lines, etc.) in the output image are usually related to noise. In the case where a neural network is applied to perform image enhancement processing, the amplitude of input noise is adjusted according to actual needs (whether or not the details need to be highlighted, the degree of highlighting the details, etc.), so that the output image can meet the actual needs. For instance, in some embodiments, the noise amplitude of the random noise image may be zero; and for instance, in some other embodiments, the noise amplitude of the random noise image may not be zero. The embodiments of the present disclosure are not limited in this aspect.

For example, in FIG. 3A and FIG. 3B, the order of each stage is determined from top to bottom.

For example, in some embodiments, the resolution of the initial feature image F01 of the first stage with the highest resolution can be the same as the resolution of the input image INP. For instance, in some embodiments, the input image is obtained by performing resolution conversion processing (e.g., image super-resolution reconstruction processing) on the original input image, and in this case, the resolution of the initial feature image of the N-th stage with the lowest resolution can be the same as the resolution of the original input image. It should be noted that the embodiments of the present disclosure include but are not limited to this case.

For example, in some embodiments, the resolution of the initial feature image of a former stage (e.g., the i-th stage) is an integer multiple, such as 2 times, 3 times, 4 times, etc., of the resolution of the initial feature image of a latter stage (e.g., the (i+1)-th stage), and the embodiments of the present disclosure are not limited in this aspect.

It should be noted that although both FIG. 3A and FIG. 3B show the case in which initial feature images F01~F05 (i.e., N=5) of five stages are obtained, it should not be regarded as a limitation to the present disclosure, that is, the value of N can be set according to actual needs.

Step S130: performing, based on initial feature images of second to N-th stages, cyclic scaling processing on an initial feature image of a first stage, to obtain an intermediate feature image.

For example, as illustrated in FIG. 3A and FIG. 3B, the cyclic scaling processing includes scaling processing of N−1 stages which may be hierarchically nested, and the scaling processing of each stage includes down-sampling processing DS, concatenating processing CONCAT, up-sampling processing US, and residual link addition processing ADD which are sequentially performed.

For example, as illustrated in FIG. 3A and FIG. 3B, down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, where i=1, 2, . . . , N−1.

For example, as illustrated in FIG. 3A and FIG. 3B, the concatenating processing of the i-th stage performing, based on the down-sampling output of the i-th stage and the initial feature image of the (i+1)-th stage, concatenating to obtain the concatenating output of the i-th stage, includes: taking the down-sampling output of the i-th stage as an input of scaling processing of the (i+1)-th stage, to obtain an output of the scaling processing of the (i+1)-th stage; and concatenating the output of the scaling processing of the (i+1)-th stage with the initial feature image of the (i+1)-th stage to obtain the concatenating output of the i-th stage.

The down-sampling processing DS is used to reduce the size of the feature image, thereby reducing the data amount of the feature image. For instance, the down-sampling processing can be performed through the down-sampling layer, but the embodiments of the present disclosure are not limited to this case. For instance, the down-sampling layer can be used to realize the down-sampling processing by adopting down-sampling methods, such as max pooling, average pooling, strided convolution, decimation (e.g., selecting fixed pixels), demuxout (e.g., splitting the input image into a plurality of smaller images), etc. For instance, the down-sampling layer can also be used to perform down-sampling processing by using interpolation algorithms, such as interpolation, bilinear interpolation, bicubic interpolation, Lanczos interpolation, etc. For instance, in the case where the interpolation algorithm is used for the down-sampling processing, only the interpolated value may be retained and the original pixel value may be removed, thereby reducing the size of the feature image.

The up-sampling processing US is used to increase the size of the feature image, thereby increasing the data amount of the feature image. For instance, the up-sampling processing can be performed through the up-sampling layer, but the embodiments of the present disclosure are not limited to this case. For instance, the up-sampling layer can be used to realize the up-sampling processing by adopting up-sampling methods, such as strided transposed convolution, interpolation algorithms, etc. For instance, the interpolation algorithm may include interpolation, bilinear interpolation, bicubic interpolation, Lanczos interpolation, etc. For instance, in the case where the interpolation algorithm is used for the up-sampling processing, the original pixel value and the interpolated value can be retained, thereby increasing the size of the feature image.

The scaling processing of each stage can be regarded as a residual network, and the residual network can keep the input thereof in a certain proportion in the output thereof through residual link addition processing. That is, through the residual link addition processing ADD, the input of the scaling processing of each stage can be kept in the output of the scaling processing of each stage in a certain proportion. For instance, the input and output of the residual link addition processing ADD may have the same size. For instance, taking the feature image as an example, the residual link addition processing may include adding the values of each row and column of the matrices of two feature images correspondingly, but is not limited thereto.

It should be noted that in some embodiments of the present disclosure, the down-sampling factor of the down-sampling processing of a certain stage corresponds to the up-sampling factor of the up-sampling processing of the certain stage. That is, in the case where the down-sampling factor of the down-sampling processing is 1/y, the up-sampling factor of the up-sampling processing is y, where y is a positive integer and y is usually equal to or greater than 2. Therefore, it can be ensured that the output of the up-sampling processing and the input of the down-sampling processing of the same stage may have the same size.

It should be noted that in some embodiments of the present disclosure (not limited to the present embodiment), the parameters of down-sampling processing of different stages (i.e., the parameters of the network structures corresponding to the down-sampling processing) may be the same or different; the parameters of up-sampling processing of different stages (i.e., the parameters of the network structures corresponding to the up-sampling processing) may be the same or different; and the parameters of residual link addition processing of different stages may be the same or different. The embodiments of the present disclosure are not limited in this aspect.

It should be noted that in some embodiments of the present disclosure (not limited to the present embodiment), the parameters of down-sampling processing, which are in different orders, of the same stage, may be the same or different; the parameters of up-sampling processing, which are in different orders, of the same stage, may be the same or different; and the parameters of residual link addition processing, which are in different orders, of the same stage, may be the same or different. The embodiments of the present disclosure are not limited in this aspect.

For example, in some embodiments of the present disclosure, in order to improve the global features, such as brightness, contrast, or the like of the feature image, the multi-scale cyclic sampling processing may further include: performing instance normalization processing or layer normalization processing on the output of the down-sampling processing, the output of the up-sampling processing, etc. It should be noted that the output of the down-sampling processing, the output of the up-sampling processing, or the like can be performed by adopting the same normalization processing method (instance normalization processing or layer normalization processing), or can also be performed by adopting different normalization processing methods, and the embodiments of the present disclosure are not limited in this aspect.

For example, as illustrated in FIG. 3A and FIG. 3B, the scaling processing of the (j+1)-th stage is nested between the down-sampling processing of the j-th stage and the concatenating processing of the j-th stage, where j=1, 2, . . . , N−2. That is, the output of the down-sampling processing of the j-th stage serves as the input of the scaling processing of the (j+1)-th stage; and at the same time, the output of the scaling processing of the (j+1)-th stage serves as one of the inputs of the concatenating processing of the j-th stage (while the initial feature image of the (j+1)-th stage serves as another input of the concatenating processing of the j-th stage).

It should be noted that, in the present disclosure, "nesting" means that an object includes another object which is similar or identical to the object, and the object includes but is not limited to a process, a network structure, or the like.

For example, in some embodiments, the scaling processing of at least one stage can be continuously performed a plurality of times, that is, each stage can include multiple scaling processing. For example, the output of former scaling processing serves as the input of latter scaling processing. For instance, as illustrated in FIG. 3A and FIG. 3B, the scaling processing of each stage can be continuously performed twice, and in this case, the quality of the output image can be improved while the complexity of the network structure can be reduced. It should be noted that the embodiments of the present disclosure do not limit the specific execution times of the scaling processing of each stage.

For example, in some embodiments, the resolution of the intermediate feature image is the same as the resolution of the input image INP.

For example, as illustrated in FIG. 3A and FIG. 3B, in the case where N=5, the initial feature image F01 of the first stage can be subjected to the cyclic scaling processing described above based on the initial feature images F02~F05 of second to fifth stages, so as to obtain the intermediate feature image FM.

Step S140: performing merging processing on the intermediate feature image to obtain an output image.

For example, in some embodiments, as illustrated in FIG. 3A and FIG. 3B, a merging network MERG can be used to perform merging processing on the intermediate feature image FM, so as to obtain the output image OUTP. For example, in some embodiments, the merging network can include the convolutional layer or the like. For instance, the output image may be a grayscale image including one channel, and may also be, for example, an RGB image (i.e., a color image). It should be noted that the embodiments of the present disclosure do not limit the structure and parameters of the merging network MERG, as long as the convolution feature dimension (i.e., the intermediate feature image FM) can be converted into the output image OUTP.

It should be noted that if the above image processing method is directly used to process the input image with relatively high resolution (e.g., the resolution is 4 k or above), the requirement for hardware conditions (e.g., video memory, etc.) of the image processing device is relatively high. Therefore, in some embodiments, in order to solve the above problems, firstly, the input image may be subjected to crop processing, so as to obtain a plurality of sub-input images with overlapping regions; then, the plurality of sub-input images are respectively processed by using the above-mentioned image processing method (e.g., step S110 to step S140, etc.) to obtain a plurality of corresponding sub-output images; and finally, the corresponding sub-output images are stitched into the output image.

Figure 4:
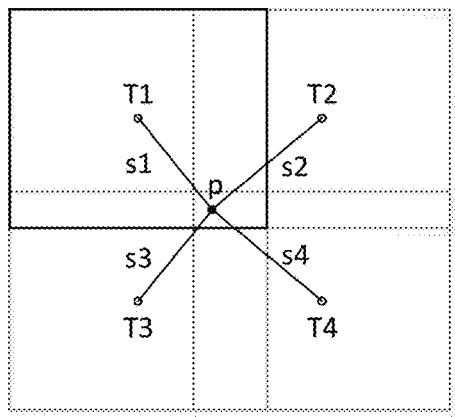
FIG. 4 is a schematic diagram of crop processing and stitch processing provided by some embodiments of the present disclosure.

FIG. 4 is a schematic diagram of crop processing and stitch processing provided by some embodiments of the present disclosure. Hereinafter, the crop processing and the stitch processing will be described in detail with reference to FIG. 4.

For example, in some embodiments, as illustrated in FIG. 4, the input image may be cropped into a plurality of sub-input images with overlapping regions (e.g., as illustrated by four rectangular frames indicated by respective centers T1~T4 in FIG. 4). The plurality of sub-input images should cover the whole input image, that is, each pixel point in the input image should be included in at least one sub-input image. For instance, in some embodiments, the plurality of sub-input images are the same in size and resolution, and the centers of the plurality of sub-input images form a uniform and regular grid, that is, the distance between adjacent centers in the horizontal direction (i.e., the row direction) and the distance between adjacent centers in the vertical direction (i.e., the column direction) should be constant, respectively. For instance, in some embodiments, the overlapping region of two adjacent sub-input images has a constant size in the row direction or/and the column direction.

It should be understood that the row and column positions of pixel points in the input image are in one-to-one correspondence with the row and column positions of pixel points in the output image, and the row and column positions of pixel points in each sub-input image are in one-to-one correspondence with the row and column positions of pixel points in a corresponding sub-output image. In other words, the four rectangular frames indicated by respective centers T1~T4 in FIG. 4 can also represent the corresponding four sub-output images.

For example, in the process of stitching a plurality of sub-output images corresponding to the plurality of sub-input images into the output image, the pixel value of each pixel point in the output image can be calculated by the following formula:

$$Y_p = \frac{1}{\sum_{k=1}^{T} S_k} \sum_{k=1}^{T} s_k Y_{k,(p)},$$

where $Y_p$ represents a pixel value of any pixel point p in the output image, T represents a count of sub-output images including the pixel point p, $Y_{k,(p)}$ represents a pixel value of the pixel point p in the k-th sub-output image including the pixel point p, and $S_k$ represents a distance between the pixel point p in the k-th sub-output image including the pixel point p and a center of the k-th sub-output image including the pixel point p.

For example, in some embodiments, the above stitch processing can be implemented by the following steps.

(1) Initializing an output image matrix, where all pixel values are set to zero. It should be noted that in the case where the output image is a grayscale image, the output image matrix has one channel; and in the case where the output image is an RGB image (i.e., a color image) with three channels, the output image matrix has three channels correspondingly.

(2) Initializing a counting matrix, where all element values are set to zero. The size (resolution) of the counting matrix is the same as the size (resolution) of the output image matrix, and the counting matrix has one channel.

(3) Adding the distance from each pixel point in each sub-output image to the center of the each sub-output image, and the current value of the element of the counting matrix corresponding to the each pixel point as a new value of the element of the corresponding counting matrix; and multiplying the pixel value of each pixel point in each sub-output image by the distance from the each pixel point to the center of the each sub-output image, and then adding the current pixel value of the output image matrix corresponding to the each pixel point as a corresponding new pixel value of the output image matrix.

(4) Dividing each pixel value in the output image matrix by a corresponding element value in the counting matrix, so as to obtain a final pixel value, thus obtaining a final output image matrix, that is, the output image. It should be understood that in the above dividing process, it should be ensured that the value of each element in the counting matrix is greater than zero.

It should be noted that although FIG. 4 merely shows the case where T=4, it should not be regarded as a limitation to the present disclosure, that is, the value of T can be set according to actual needs.

It should be noted that the above algorithm of stitch processing is exemplary, and the embodiments of the present disclosure are not limited to this case. Other algorithms of stitch processing can also be adopted, as long as the algorithm can reasonably process the pixel values of the pixel points in the overlapping region and achieve the actual needs.

It should be understood that in the case where the output image is a color image, e.g., an RGB image with 3 channels, the object of the above-mentioned crop processing and stitch processing should be the image of each channel.

The image processing method provided by the embodiments of the present disclosure obtains initial feature images with different resolutions based on the input image, and performs cyclic scaling processing on the initial feature image with the highest resolution in combination with the initial feature images with different resolutions, which can obtain higher image fidelity and greatly improve the quality of the output image, and at the same time, can also improve the processing speed.

Figure 5:
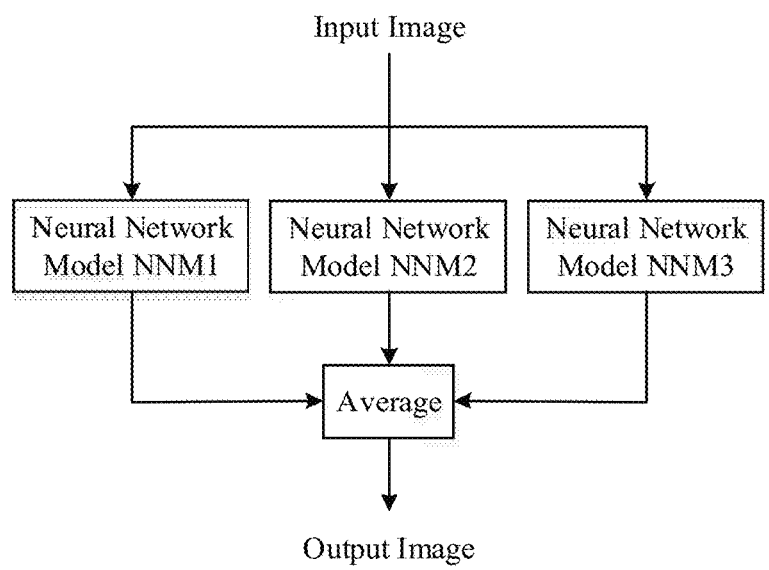
FIG. 5 is a schematic diagram of a combined neural network model provided by some embodiments of the present disclosure.

At least one embodiment of the present disclosure further provides an image processing method based on a combined neural network model. FIG. 5 is a schematic diagram of a combined neural network model provided by some embodiments of the present disclosure. For example, as illustrated in FIG. 5, the combined neural network model includes a plurality of neural network models. For instance, the neural network models are configured to execute the same image processing task, input images of the neural network models have the same resolution (i.e., size), and output images of the neural network models also have the same resolution (i.e., size). At the same time, any two of the plurality of neural network models are different in at least one of the structure or parameter (different in parameter means that the parameters are at least not completely the same). For instance, in some embodiments, the neural network models with the same structure but different parameters can be trained based on different training configurations. For instance, the above-mentioned different training configurations refer to one or any combination of different training sets, different initial parameters, different convolution kernel sizes, different super-parameters, etc.

For example, as illustrated in FIG. 5, the image processing method based on the combined neural network model may include: inputting an input image into the plurality of neural network models in the combined neural network model, to obtain outputs of the plurality of neural network models, respectively; and averaging the outputs of the plurality of neural network models to obtain an output (i.e., an output image) of the combined neural network model.

It should be noted that in practical applications, models with multiple kinds of neural network structures are usually trained by adjusting super-parameters, thus producing many trained models; afterwards, the model with the best performance (that is, with the best output effect) is selected from these models as a main solution; and in the subsequent phase, the selected model is mainly optimized, but those models with similar or slightly worse performance but eliminated are usually not utilized again. In contrast, the image processing method based on the combined neural network model provided by the embodiments of the present disclosure can utilize these models with similar or slightly worse performance, so that the output effect of the combined neural network model is better than the output effect of the single neural network with the best performance.

It should be understood that for the neural network model with other specific structures that executes the same image processing task (in this case, it is not required whether the training configuration is the same), if the sizes of the input and output of the neural network model with other specific structures that executes the same image processing task are the same as the sizes of the input and output of the above-mentioned single neural network model, the neural network model can be incorporated into the existing combined neural network model by means of adding or replacing (e.g., in replace of a model with poor performance), as long as the new combined neural network model has better output effect.

For example, in some embodiments, the plurality of neural network models may include a first neural network model, and the first neural network model is configured to perform a first image processing method. For instance, the first image processing method is the image processing method (e.g., including the above steps S110 to S140, etc.) provided by the aforementioned embodiments, and the embodiments of the present disclosure include but are not limited to this case.

It should be noted that although FIG. 5 merely shows the case where the combined neural network model includes three neural network models NNM1~NNM3, it should not be regarded as a limitation to the present disclosure, that is, the combined neural network model may include more or fewer neural network models according to actual needs.

It should be noted that the construction of the combined neural network model may refer to the related description of a constructing method of a combined neural network model which will be described below, and details are not described herein.

The image processing method based on the combined neural network model provided by the embodiments of the present disclosure can directly average the outputs of the plurality of neural network models to obtain a better output effect, and the combined neural network model is easy to be updated (i.e., the new neural network model can be added, or the neural network model with poor performance in the existing combined neural network model can be replaced by the new neural network model, etc.).

Technical effects of the image processing method based on the combined neural network model provided by the embodiments of the present disclosure may be referred to the related description of the image processing method in the above embodiments, and details are not described herein.

Figure 6:
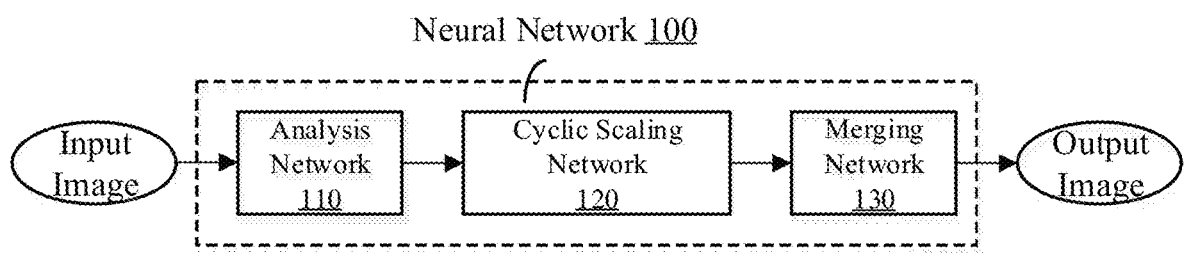
FIG. 6 is a schematic structural diagram of a neural network provided by an embodiment of the present disclosure.

At least one embodiment of the present disclosure further provides a training method of a neural network. FIG. 6 is a schematic structural diagram of a neural network provided by an embodiment of the present disclosure, FIG. 7A is a flowchart of a training method of a neural network provided by an embodiment of the present disclosure, and FIG. 7B is a schematic block diagram of an architecture of training the neural network illustrated in FIG. 6 corresponding to the training method illustrated in FIG. 7A provided by an embodiment of the present disclosure.

For example, as illustrated in FIG. 6, the neural network 100 includes an analysis network 110, a cyclic scaling network 120, and a merging network 130. For example, the neural network 100 can be used to execute the image processing method provided by the aforementioned embodiments (e.g., the embodiment shown in FIG. 3A or FIG. 3B). For example, the analysis network 110 can be used to execute step S120 in the aforementioned image processing method, that is, the analysis network 110 can process the input image to obtain initial feature images of N stages with resolutions from high to low, where N is a positive integer and N>2; the cyclic scaling network 120 can be used to execute step S130 in the aforementioned image processing method, that is, the cyclic scaling network 120 can perform, based on initial feature images of second to N-th stages, cyclic scaling processing on an initial feature image of a first stage, to obtain an intermediate feature image; and the merging network 130 can be used to execute step S140 in the aforementioned image processing method, that is, the merging network 130 can perform merging processing on the intermediate feature image to obtain an output image. For instance, the specific structures of the neural network 100, the analysis network 110, the cyclic scaling network 120, and the merging network 130 and the corresponding specific processing procedures and details thereof may refer to the related description in the aforementioned image processing method, which will not be described herein again.

For example, the input image and the output image may also refer to the related description of the input image and the output image in the image processing method provided in the above embodiments, and details are not described herein.

Figure 7A:
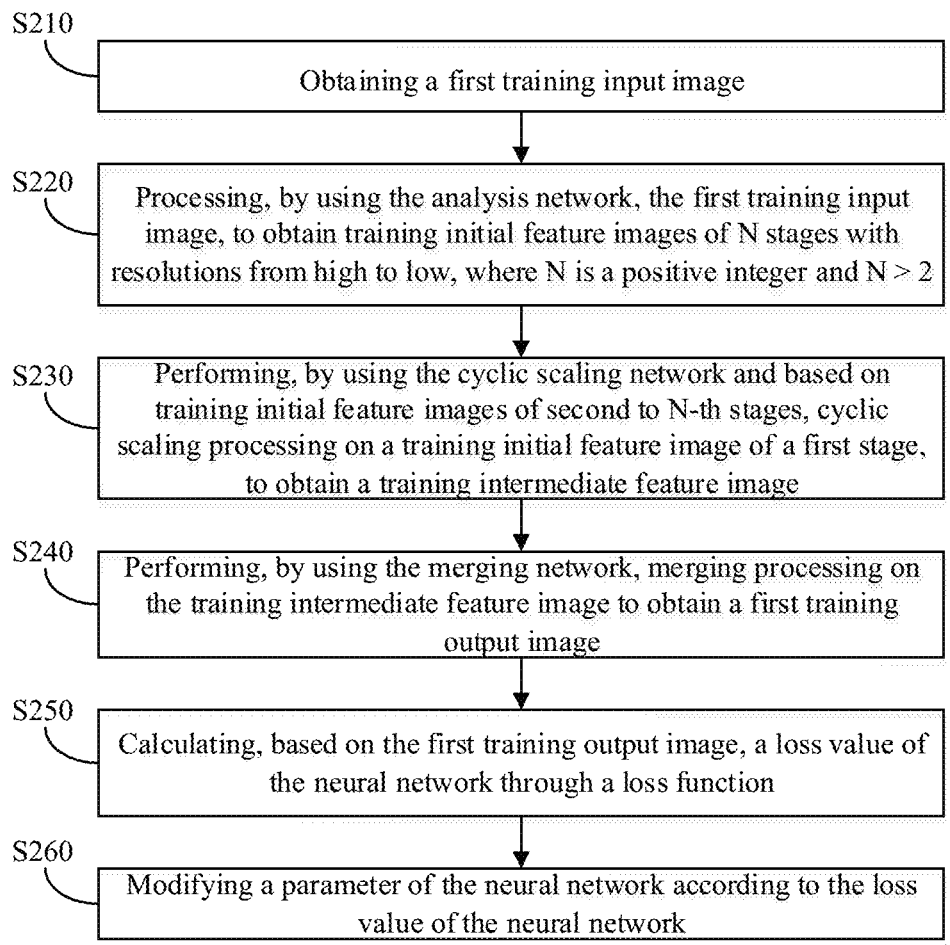
FIG. 7A is a flowchart of a training method of a neural network provided by an embodiment of the present disclosure.
Figure 7B:
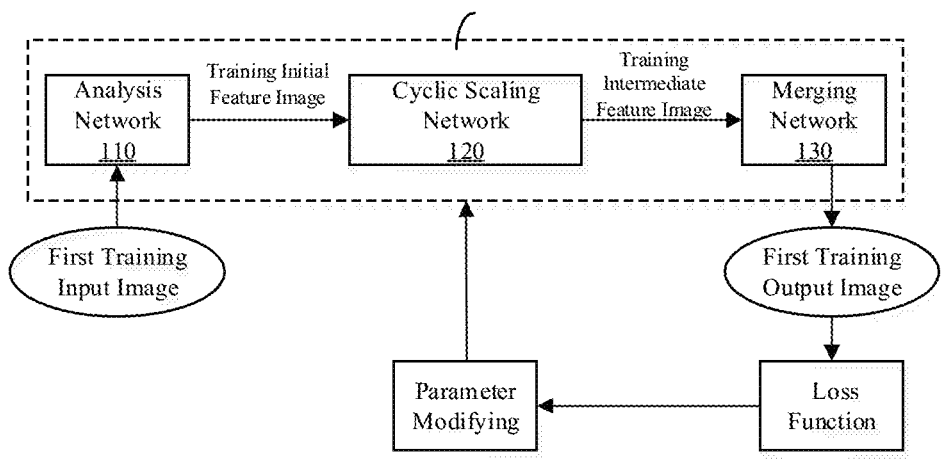
FIG. 7B is a schematic block diagram of an architecture of training the neural network illustrated in FIG. 6 corresponding to the training method illustrated in FIG. 7A provided by an embodiment of the present disclosure.

For example, as illustrated in FIG. 7A and FIG. 7B, the training method of the neural network includes steps S210 to S260.

Step S210: obtaining a first training input image.

For example, similar to the input image in the aforementioned step S110, the first training input image may also include a photo taken and acquired by a camera of a smart phone, a camera of a tablet computer, a camera of a personal computer, a lens of a digital camera, a surveillance camera, a network camera, etc., and the first training input image may include a person image, an animal/plant image, a landscape image, etc. The embodiments of the present disclosure are not limited in this aspect.

For example, the first training input image may be a grayscale image, and may also be a color image. For instance, the color image may include but is not limited to an RGB image including three channels.

For example, in some embodiments, the first training input image is obtained by obtaining an original training input image and performing resolution conversion processing (e.g., image super-resolution reconstruction processing) on the original training input image. In the common implementation of the image super-resolution reconstruction technology, a super-resolution image is usually generated by the interpolation algorithm. For instance, commonly used interpolation algorithms include nearest neighbor interpolation, bilinear interpolation, bicubic interpolation, Lanczos interpolation, etc. By using one of the above interpolation algorithms, a plurality of pixels can be generated based on one pixel in the original training input image, so as to obtain a super-resolution first training input image based on the original training input image.

Step S220: processing, by using the analysis network, the first training input image, to obtain training initial feature images of N stages with resolutions from high to low, where N is a positive integer and N>2.

For example, similar to the analysis network in the aforementioned step S120, the analysis network 110 may include N analysis sub-networks, and the analysis sub-networks are configured to respectively perform the analysis processing of different stages, so as to obtain the training initial feature images of the N stages with resolutions from high to low, respectively. For example, each analysis sub-network can be implemented as a convolutional network module, which includes a convolutional neural network (CNN), a residual network (ResNet), a dense network (DenseNet), etc. For instance, each analysis sub-network may include a convolutional layer, a down-sampling layer, a normalization layer, etc., but is not limited to this case.

For example, in some embodiments, the resolution of the training initial feature image of the first stage with the highest resolution can be the same as the resolution of the first training input image. For instance, in some embodiments, the first training input image is obtained by performing resolution conversion processing (e.g., image super-resolution reconstruction processing) on the original training input image, and in this case, the resolution of the training initial feature image of the N-th stage with the lowest resolution can be the same as the resolution of the original training input image. It should be noted that the embodiments of the present disclosure include but are not limited to this case.

Step S230: performing, by using the cyclic scaling network and based on training initial feature images of second to N-th stages, cyclic scaling processing on a training initial feature image of a first stage, to obtain a training intermediate feature image.

For example, the specific procedure and details of the cyclic scaling processing of the cyclic scaling network 120 in step S230 may refer to the related description of the cyclic scaling processing in the aforementioned step S130, and are not repeated here.

Step S240: performing, by using the merging network, merging processing on the training intermediate feature image to obtain a first training output image.

For example, similar to the merging network in the aforementioned step S140, the merging network 130 may also include a convolutional layer or the like. For instance, the first training output image may be a grayscale image including one channel, and may also be, for example, an RGB image (i.e., a color image) including three channels. It should be noted that the embodiments of the present disclosure do not limit the structure and parameters of the merging network 130, as long as the convolution feature dimension (i.e., the training intermediate feature image) can be converted into the first training output image.

Step S250: calculating, based on the first training output image, a loss value of the neural network through a loss function.

For example, the parameters of the neural network 100 include the parameters of the analysis network 110, the parameters of the cyclic scaling network 120, and the parameters of the merging network 130. For instance, the initial parameters of the neural network 100 may be random numbers, and for instance, the random numbers conform to Gaussian distribution, which is not limited in the embodiments of the present disclosure.

For example, in some embodiments, the training initial feature images of the N stages are obtained by directly performing analysis processing of different stages on the first training input image (which is not concatenated with the random noise image) through the analysis network 110 (referring to FIG. 3A). In this case, the above loss function can be expressed as:

$$L(Y, X) = \sum_{k=1}^{N} E[|S_{k-1}(Y) - S_{k-1}(X)|],$$

where L(Y, X) represents the loss function, Y represents the first training output image, X represents a first training standard image corresponding to the first training input image, $S_{k-1}(\ )$ represents performing down-sampling processing of a (k−1)-th stage, $S_{k-1}(Y)$ represents an output obtained by performing the down-sampling processing of the (k−1)-th stage on the first training output image, $S_{k-1}(X)$ represents an output obtained by performing the down-sampling processing of the (k−1)-th stage on the first training standard image, and E[ ] represents calculation of matrix energy. For instance, E[ ] may represent calculating the maximum or average value of elements in the matrix in "[ ]".

For example, the first training standard image X has the same scene as the first training input image, that is, the contents of the first training standard image X and the first training input image are the same, and at the same time, the quality of the first training standard image X is higher than the quality of the first training output image. For instance, the first training standard image X is equivalent to a target output image of the neural network 100. For instance, the image quality evaluation criterion includes the mean square error (MSE), similarity (SSIM), peak signal-to-noise ratio (PSNR), etc. For instance, the first training standard image X may be a photo taken by a digital single lens reflex camera. For instance, in some embodiments, the interpolation algorithm, such as bilinear interpolation, bicubic interpolation, Lanczos interpolation, etc., can be adopted to perform down-sampling processing on the first training standard image X, so as to obtain the original training input image, and then the original training input image is subjected to resolution conversion processing (e.g., image super-resolution reconstruction processing) to obtain the first training input image, thereby ensuring that the first training standard image X and the first training input image have the same scene. It should be noted that the embodiments of the present disclosure include but are not limited to this case.

For example, in the case where k=1, $S_{k-1}(\ )=S_0(\ )$, that is, the down-sampling processing of the 0th stage, which indicates that no down-sampling processing is performed. In the case where k>1, the resolution of the output of the down-sampling processing of the (k−1)-th stage decreases with the increase of k. For instance, the down-sampling method adopted by the down-sampling processing of the (k−1)-th stage may be the same as the down-sampling method adopted by the down-sampling processing of the (k−1)-th stage in the aforementioned cyclic scaling processing. For instance, in some embodiments, the resolutions of $S_1(Y)$ and $S_1(X)$ are the same as the resolution of the down-sampling output of the first stage in the aforementioned cyclic scaling processing, the resolutions of $S_2(Y)$ and $S_2(X)$ are the same as the resolution of the down-sampling output of the second stage in the aforementioned cyclic scaling processing, the resolutions of $S_3(Y)$ and $S_3(X)$ are the same as the resolution of the down-sampling output of the third stage in the aforementioned cyclic scaling processing, . . . , and so on; and the resolutions of $S_{N-1}(Y)$ and $S_{N-1}(X)$ are the same as the resolution of the down-sampling output of the (N−1)-th stage in the aforementioned cyclic scaling processing. It should be noted that the embodiments of the present disclosure are not limited to this case.

For example, in the present embodiment, the training goal of the neural network 100 is to minimize the loss value. For instance, during the training process of the neural network 100, the parameters of the neural network 100 are continuously revised, so that the first training output image output by the neural network 100 after the parameters being revised is continuously close to the first training standard image, thereby continuously reducing the loss value. It should be noted that the above loss function provided by the present embodiment is exemplary, and the embodiments of the present disclosure include but are not limited thereto.

For example, in some other embodiments, the training initial feature images of the N stages are obtained by firstly concatenating (CONCAT) the first training input image with a random noise image to obtain a training concatenating input image, and then performing analysis processing of N different stages on the training concatenating input image through the analysis network 110 (referring to FIG. 3B). In this case, the training process of the neural network 100 needs to be carried out in conjunction with a discriminative network. For instance, in some embodiments, the first training output image may be processed by using a discriminative network, and the loss value of the neural network 100 can be calculated based on the output of the discriminative network corresponding to the first training output image.

Figure 8:
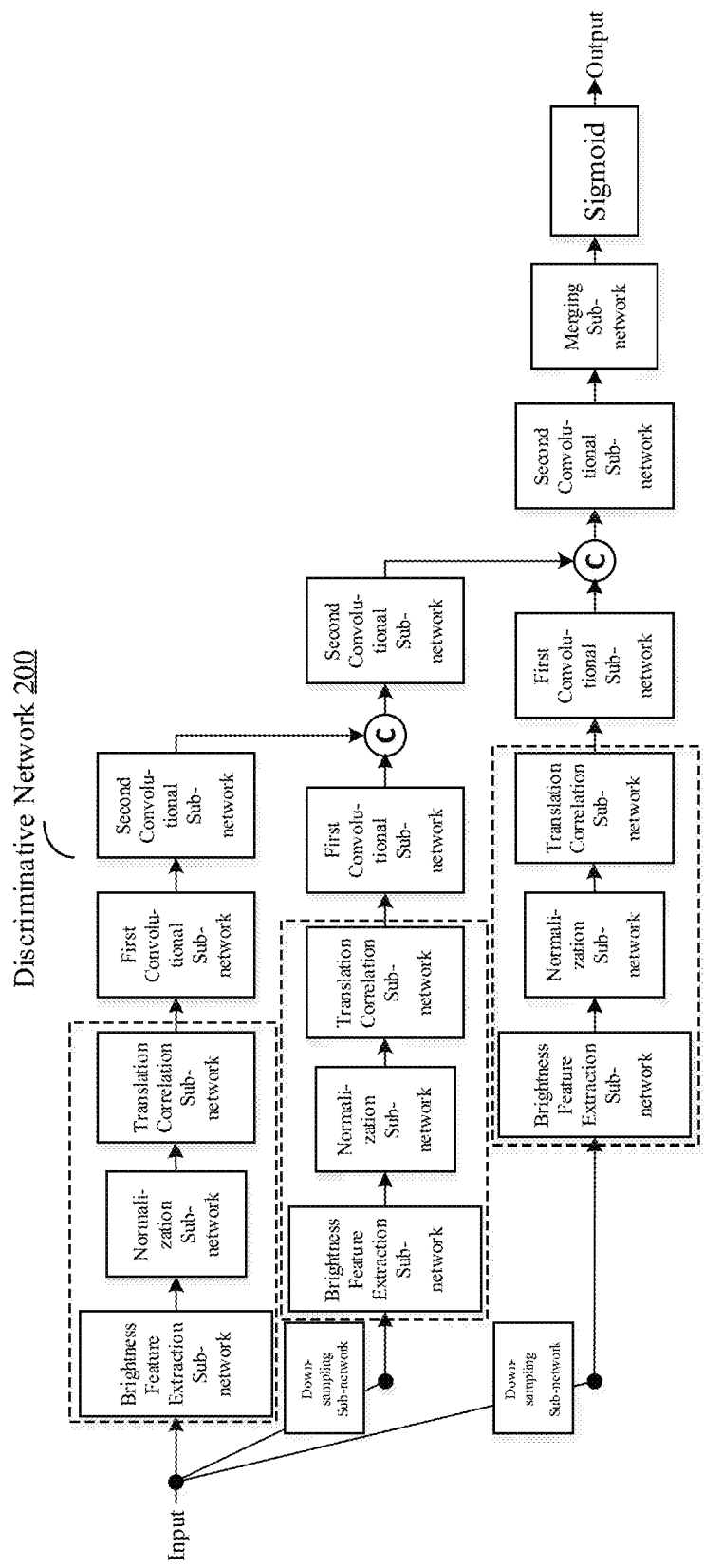
FIG. 8 is a schematic structural diagram of a discriminative network provided by some embodiments of the present disclosure.

FIG. 8 is a schematic structural diagram of a discriminative network provided by some embodiments of the present disclosure. As illustrated in FIG. 8, the discriminative network 200 includes down-sampling sub-networks of M−1 stages, discriminative sub-networks of M stages, a merging sub-network, and an activation layer, where M is a positive integer and M>1. For instance, FIG. 8 shows the case where M=3, but it should not be regarded as a limitation to the present disclosure, that is, the value of M can be set according to actual needs. For instance, in some embodiments, M=N−1. For instance, in FIG. 8, the order of each stage is determined from top to bottom.

For example, as illustrated in FIG. 8, when the discriminative network is used to process the first training output image, firstly, the first training output image is subjected to down-sampling processing of different stages through the down-sampling sub-networks of the M−1 stages, so as to obtain outputs of the down-sampling sub-networks of the M−1 stages; then, the first training output image and the outputs of the down-sampling sub-networks of the M−1 stages serve as the inputs of the discriminative sub-networks of the M stages, respectively. For example, in some embodiments, the resolution of the output of the down-sampling sub-network of a former stage is higher than the resolution of the output of the down-sampling sub-network of a latter stage. For example, in some embodiments, the first training output image serves as the input of the discriminative sub-network of the first stage, the output of the down-sampling sub-network of the first stage serves as the input of the discriminative sub-network of the second stage, the output of the down-sampling sub-network of the second stage serves as the input of the discriminative sub-network of the third stage, . . . , and so on; and the output of the down-sampling sub-network of the (M−1)-th stage serves as the input of the discriminative sub-network of the M-th stage.

For example, the down-sampling sub-network includes a down-sampling layer. For instance, the down-sampling sub-network can realize down-sampling processing by adopting down-sampling methods, such as max pooling, average pooling, strided convolution, decimation (e.g., selecting fixed pixels), demuxout (e.g., splitting the input image into a plurality of smaller images), etc. For instance, the down-sampling layer can also be used to perform down-sampling processing by using interpolation algorithms, such as interpolation, bilinear interpolation, bicubic interpolation, Lanczos interpolation, etc.

For example, as illustrated in FIG. 8, the discriminative sub-network of each stage includes a brightness processing sub-network (as illustrated by the dashed frame in FIG. 8), a first convolution sub-network, and a second convolution sub-network which are connected in sequence. For instance, in some embodiments, the brightness processing sub-network may include a brightness feature extraction sub-network, a normalization sub-network, and a translation correlation sub-network.

For example, the brightness feature extraction sub-network of each stage is configured to extract the brightness feature image of the input of the discriminative sub-network of each stage. Human eyes are sensitive to the brightness feature of the image, but not sensitive to other features, and therefore, by extracting the brightness feature of the training image, some unnecessary information can be removed, thus reducing the amount of computation. It should be understood that the brightness feature extraction sub-network can be used to extract a brightness feature image of a color image, that is, the brightness feature extraction sub-network works in the case where the first training output image is a color image; and in the case where the input (i.e., the first training output image or the like) of the discriminative sub-network is a grayscale image, the brightness feature extraction sub-network may not be needed.

Taking that the first training output image is an RGB image (i.e., a color image) with three channels as an example, in this case, the outputs of the down-sampling sub-networks of the M−1 stages are also RGB images with three channels, that is, the input of the discriminative sub-network of each stage is the RGB image with three channels. In this case, the feature extraction sub-network can extract the brightness feature image by using the following formula:

$$P=0.299R+0.587G+0.114B,$$

where R, G and B respectively represent red information (i.e., data information of the first channel), green information (i.e., data information of the second channel), and blue information (i.e., data information of the third channel) of an image in RGB format, and P represents brightness information obtained through conversion.

For example, the normalization sub-network is configured to normalize the brightness feature image to obtain a normalized brightness feature image. After normalization, the pixel values of the normalized brightness feature image can be restricted in a relatively small numerical range, thus preventing some pixel values from being too large or too small, and further facilitating the calculation of correlation.

For example, the normalized sub-network can perform normalization processing by using the following formula:

$$\begin{cases} J = (I-\mu)/(\sigma+1) \\ \sigma^2 = \text{Blur}\,(I^2) - \mu, \\ \mu = \text{Blur}\,(I) \end{cases}$$

where J is a normalized brightness feature image, I is a brightness feature image, and Blur( ) is a Gaussian blur operation. That is, Blur(I) represents performing the Gaussian blur operation on the brightness feature image, and Blur($I^2$) represents squaring each pixel value in the brightness feature image to obtain a new feature image, and performing the Gaussian blur operation on the new feature image. And μ is the image obtained by performing the Gaussian blur operation on the brightness feature image, and $\sigma^2$ is the variance normalized image of the brightness feature image.

For example, the translation correlation sub-network is configured to perform multiple image translation processing on the normalized brightness feature image to obtain a plurality of shift images, and is configured to generate a plurality of correlation images according to correlation between the normalized brightness feature image and each shift image.

For example, in some embodiments, each image translation processing includes: translating the last a columns of pixels of the normalized brightness feature image to front of the remaining pixels along the row direction, so as to obtain an intermediate image; and then, translating the last b rows of pixels of the intermediate image to front of the remaining pixels along the column direction, so as to obtain a shift image, where 0≤a<H, 0≤b<W, a and b are integers, H is the total number of rows of pixels in the normalized brightness feature image, and W is the total number of columns of pixels in the normalized brightness feature image; and in addition, during any two image translation processing, the value of at least one of a or b is changed. In the shift image obtained by the image translation processing in this way, the values of the pixels are the same as the values of the pixels of the brightness feature image in one-to-one correspondence; furthermore, the values of the pixels in the i-th row and j-th column in all the shift images come from the pixels at different positions in the normalized brightness feature image.

It should be noted that in the case where a and b are zero at the same time, the shift image is the normalized brightness feature image itself. In addition, in each image translation process, firstly, the last b rows of pixels of the normalized brightness feature image can be translated to front of the remaining pixels along the column direction, so as to obtain an intermediate image, and then the last a columns of pixels of the intermediate image can be translated to front of the remaining pixels along the row direction, so as to obtain a shift image. For instance, in some embodiments, the number of times of the image translation processing is H*W times (where the case that both a and b are zero counts), so that H*W correlation images are obtained.

For example, in some embodiments, according to the correlation between the normalized brightness feature image and each shift image, a plurality of correlation images are generated, which includes: taking the product of the value of the pixel in the i-th row and j-th column of the normalized brightness feature image and the value of the pixel in the i-th row and j-th column of each shift image as the value of the pixel in the i-th row and j-th column of a corresponding correlation image, where 1≤i≤H, 1≤j≤W, and i and j are integers.

For example, the first convolution sub-network is configured to perform convolution processing on the plurality of correlation images to obtain a first convolution feature image. That is, the first convolution sub-network may include a convolutional layer. For instance, in some embodiments, the first convolution sub-network may also include a normalization layer, so that the first convolution sub-network can also perform normalization processing. It should be noted that the embodiments of the present disclosure include but are not limited to this case.

For example, the second convolution sub-network may include aconvolutional layer and a down-sampling layer, so that the input of the second convolution sub-network can be subjected to convolution processing and down-sampling processing. For instance, as illustrated in FIG. 8, the output of the first convolution sub-network in the discriminative sub-network of the first stage serves as the input of the second convolution sub-network in the discriminative sub-network of the first stage; and the output of the second convolution sub-network in the discriminative sub-network of the t-th stage is concatenated (CONCAT) with the output of the first convolution sub-network in the discriminative sub-network of the (t+1)-th stage, serving as the input of the second convolution sub-network in the discriminative sub-network of the (t+1)-th stage, where t is an integer, and 1≤t≤M−1.

For example, as illustrated in FIG. 8, the merging sub-network is connected to the second convolution sub-network in the discriminative sub-network of the M-th stage, and the merging sub-network is configured to perform merging processing on the output of the second convolution sub-network in the discriminative sub-network of the M-th stage, so as to obtain a discriminative output image. For instance, in some embodiments, the specific structure of the merging sub-network and the specific procedure and details of the merging processing may refer to the related description of the merging network mentioned above, and are not repeated here.

For example, as illustrated in FIG. 8, the activation layer is connected to the merging sub-network. For instance, in some embodiments, the activation function of the activation layer can adopt the Sigmoid function, so that the output of the activation layer (i.e., the output of the discriminative network 200) is a value within the value range of [0, 1]. For instance, the output of the discriminative network 200 can be used to indicate, for example, the quality of the first training output image. For instance, the greater the value output by the discriminative network 200, for example, approaching to 1, indicating that the higher the quality of the first training output image (e.g., more similar to the quality of the first training standard image) determined by the discriminative network 200. For instance, the smaller the value output by the discriminative network 200, for example, approaching to 0, indicating that the lower the quality of the first training output image (e.g., less similar to the quality of the first training standard image) determined by the discriminative network 200.

For example, in the case where the neural network 100 is trained in conjunction with the above-mentioned discriminative network 200, the loss function of the neural network 100 can be expressed as:

$$L(Y,X)=\lambda_1 L_G(Y_{W=1})+\lambda_2 L_{L1}(S_M(Y_{W=1}),S_M(X))+\lambda_3 L_{cont}(Y_{W=1},X)+\lambda_4 L_{L1}(Y_{W=0},X)+\lambda_5 L_{L1}(S_M(Y_{W=0}),S_M(X)),$$

where L(Y, X) represents the loss function, Y represents the first training output image, Y includes $Y_{W=1}$ and $Y_{W=0}$, X represents a first training standard image corresponding to the first training input image, $L_G(Y_{W=1})$ represents a generative loss function, $Y_{W=1}$ represents a first training output image obtained in the case where the noise amplitude of the random noise image is not zero, $L_{L1}(S_M(Y_{W=1}), S_M(X))$ represents a first contrast loss function, $L_{cont}(Y_{W=1}, X)$ represents a content loss function, $L_{L1}((Y_{W=0}), X)$ represents a second contrast loss function, $Y_{W=0}$ represents a first training output image obtained in the case where the noise amplitude of the random noise image is zero, $L_1(S_M(Y_{W=0}), S_M(X))$ represents a third contrast loss function, $S_M( )$ represents performing down-sampling processing of an M-th stage, and $\lambda_1, \lambda_2, \lambda_3, \lambda_4$, and $\lambda_5$ represent preset weight values, respectively.

For example, the preset weight values can be adjusted according to actual needs. For instance, in some examples, $$\lambda_1:\lambda_2:\lambda_3:\lambda_4:\lambda_5=0.001:10:0.1:10:10,$$

and the embodiments of the present disclosure include but are not limited to this case.

For example, in some embodiments, the generative loss function $L_G(Y_{W=1})$ can be expressed as:

$$L_G(Y_{W=1})=-E[\log(\text{Sigmoid}(C(Y_{W=1})-C(X)))],$$

where E[ ] represents calculating the matrix energy. For instance, E[ ] may represent calculating the maximum or average value of the elements in the matrix in "[ ]".

For example, in some embodiments, a content feature extraction module can be used to provide the content features of the first training output image and the first training standard image. For instance, in some embodiments, the content feature extraction module may be a conv3-4 module in a VGG-19 network, and the embodiments of the present disclosure include but are not limited to this case. It should be noted that the VGG-19 network is a kind of deep convolutional neural network, which was developed by Visual Geometry Group of Oxford University and has been widely used in the field of visual recognition. For instance, in some embodiments, the content loss function $L_{cont}(Y_{W=1}, X)$ can be expressed as:

$$L_{cont}(Y_{W=1}, X) = \frac{1}{2S_1}\sum_{ij}(F_{ij}-P_{ij}),$$

where S1 is a constant value, $F_{ij}$ represents a value of a j-th position in a first content feature image of the first training output image extracted by an i-th convolution kernel in the content feature extraction module, and $P_{ij}$ represents a value of a j-th position in a second content feature image of the first training standard image extracted by the i-th convolution kernel in the content feature extraction module.

It should be noted that the content loss function expressed by the above formula is exemplary. For instance, the content loss function can also be expressed as any other commonly used formula, and the embodiments of the present disclosure are not limited in this aspect.

It should be noted that the specific expression form of the loss function of the neural network 100 is exemplary, and the embodiments of the present disclosure are not limited in this aspect. That is, the loss function of the neural network 100 may include more or fewer components according to actual needs.

Step S260: modifying a parameter of the neural network according to the loss value of the neural network.

For example, an optimization function (not shown in FIG. 7B) may also be included in the training process of the neural network 100. The optimization function can calculate the error values of the parameters of the neural network 100 according to the loss value calculated through the loss function, and revise the parameters of the neural network 100 according to the error values. For instance, the optimization function can adopt a stochastic gradient descent (SGD) algorithm, a batch gradient descent (BGD) algorithm, or the like to calculate the error values of the parameters of the neural network 100.

For example, in some embodiments, the training method of the neural network 100 may further include: determining whether the training of the neural network meets a predetermined condition; if the predetermined condition is not met, repeating the training process (i.e., steps S210 to S260); and if the predetermined condition is met, stopping the training process and obtaining a trained neural network. For instance, in some embodiments, the above predetermined condition is that the loss values corresponding to two (or more) consecutive first training output images are no longer significantly reduced. For instance, in some other embodiments, the predetermined condition is that the number of training times or training periods of the neural network reaches a predetermined number. It should be noted that the embodiments of the present disclosure are not limited to these cases.

For example, the first training output image Y output by the trained neural network 100 is close to the first training standard image X in terms of content, quality, or the like.

Figure 9:
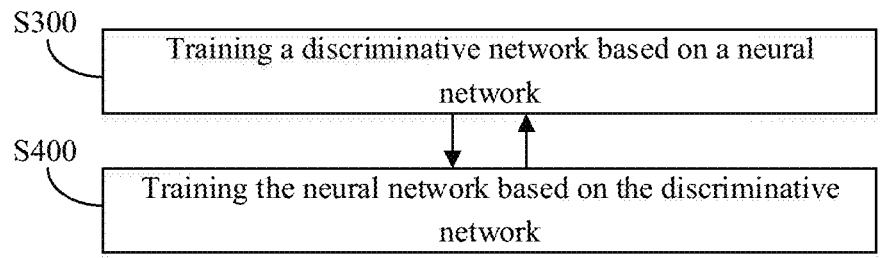
FIG. 9 is a flowchart of generative adversarial training provided by some embodiments of the present disclosure.

It should be noted that, in the process of training the neural network 100 in conjunction with the discriminative network 200, it is usually necessary to carry out generative adversarial training. FIG. 9 is a flowchart of generative adversarial training provided by some embodiments of the present disclosure. For instance, as illustrated in FIG. 9, the generative adversarial training includes:

Step S300: training a discriminative network based on a neural network; and

Step S400: training the neural network based on the discriminative network.

The above training processes are alternately executed to obtain a trained neural network.

For example, the training process of the neural network in step S400 can be realized through the above steps S210 to S260, and details are not described herein again. It should be noted that during the training process of the neural network 100, the parameters of the discriminative network 200 remain unchanged. It should be noted that in the generative adversarial training, the neural network 100 may also be generally referred to as a generative network 100.

Figure 10A:
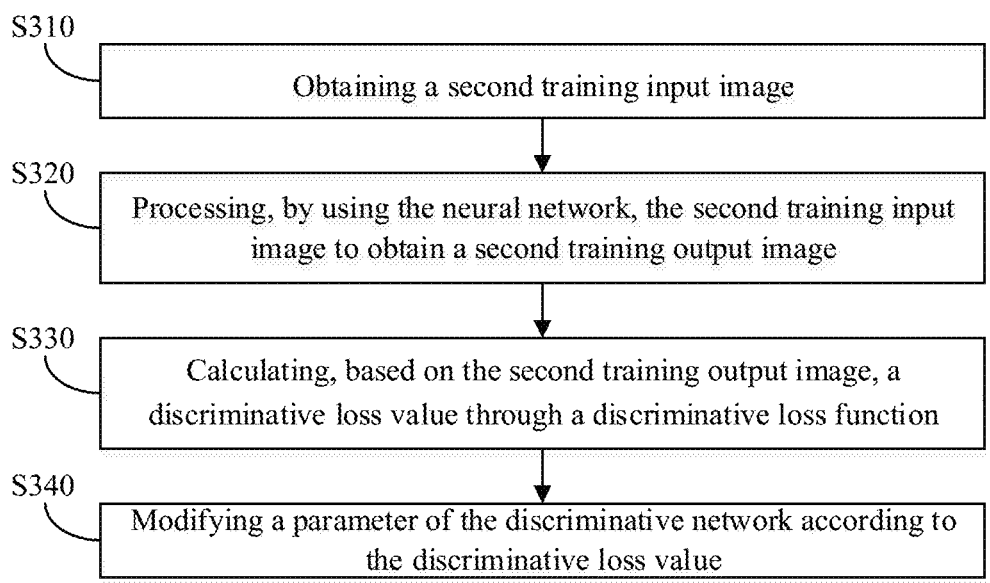
FIG. 10A is a flowchart of a training method of a discriminative network provided by some embodiments of the present disclosure.
Figure 10B:
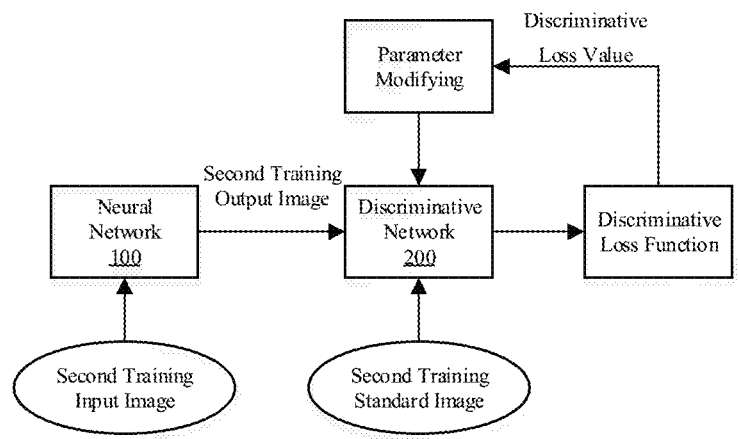
FIG. 10B is a schematic block diagram of an architecture of training the discriminative network illustrated in FIG. 8 corresponding to the training method illustrated in FIG. 10A provided by some embodiments of the present disclosure.

FIG. 10A is a flowchart of a training method of a discriminative network provided by some embodiments of the present disclosure, and FIG. 10B is a schematic block diagram of an architecture of training the discriminative network illustrated in FIG. 8 corresponding to the training method illustrated in FIG. 10A provided by some embodiments of the present disclosure. Hereinafter, the training process of the discriminative network 200 (i.e., step S300) will be described in detail with reference to FIG. 10A and FIG. 10B.

For example, as illustrated in FIG. 10A and FIG. 10B, the training process of the discriminative network 200, i.e., step S300, includes steps S310 to S340 as follows:

Step S310: obtaining a second training input image;

Step S320: processing, by using the neural network, the second training input image to obtain a second training output image;

Step S330: calculating, based on the second training output image, a discriminative loss value through a discriminative loss function; and Step S340: modifying a parameter of the discriminative network according to the discriminative loss value.

For example, the training process of the discriminative network 200, i.e., step S400, may further include: determining whether the training of the discriminative network 200 meets a predetermined condition; if the predetermined condition is not met, repeating the training process of the discriminative network 200; and if the predetermined condition is met, stopping the training process of the discriminative network 200 and obtaining a trained discriminative network 200. For instance, in one example, the above predetermined condition is that the discriminative loss values corresponding to two (or more) consecutive pairs of the second training output images and the second training standard images are no longer significantly reduced. For instance, in another example, the above predetermined condition is that the number of training times or training periods of the discriminative network 200 reaches a predetermined number. It should be noted that the embodiments of the present disclosure are not limited to these cases.

For example, as illustrated in FIG. 10A, during the training process of the discriminative network 200, the training needs to be performed in conjunction with the neural network 100. It should be noted that during the training process of the discriminative network 200, the parameters of the neural network 100 remain unchanged.

It should be noted that the above examples merely illustratively describe the training process of the discriminative network. Those skilled in the art should know that in the training phase, it is necessary to use a large number of sample images to train the discriminative network; and at the same time, in the training process of each sample image, multiple iterations can be included to revise the parameters of the discriminative network. For another example, the training phase further includes performing fine-tune operation on the parameters of the discriminative network, so as to obtain more optimized parameters.

For example, the initial parameters of the discriminative network 200 can be random numbers, for instance, the random numbers conform to Gaussian distribution, and the embodiments of the present disclosure are not limited to this case.

For example, an optimization function (not shown in FIG. 10A) can also be included in the training process of the discriminative network 200. The optimization function can calculate the error values of the parameters of the discriminative network 200 according to the discriminative loss value calculated through the discriminative loss function, and can revise the parameters of the discriminative network 200 according to the error values. For instance, the optimization function can adopt a stochastic gradient descent (SGD) algorithm, a batch gradient descent (BGD) algorithm, or the like to calculate the error values of the parameters of the discriminative network 200.

For example, the second training input image can be the same as the first training input image. For example, the set of second training input images and the set of first training input images may be the same image set, and the embodiments of the present disclosure include but are not limited to this case. For example, the second training input image can refer to the related description of the first training input image mentioned above, and details are not repeated here.

For example, in some embodiments, the discriminative loss function can be expressed as:

$$L_D(V_{W=1}) = -E[\log(\text{Sigmoid}(C(U) - C(V_{W=1})))],$$

where $L_D(V_{W=1})$ represents the discriminative loss function, U represents a second training standard image corresponding to the second training input image, $V_{W=1}$ represents the second training output image obtained in the case where the noise amplitude of the random noise image is not zero, $C(U)$ represents a discriminative output image obtained by taking the second training standard image as an input of the discriminative network, and $C(V_{W=1})$ represents a discriminative output image obtained in the case where the noise amplitude of the random noise image is not zero.

For example, the second training standard image U has the same scene as the second training input image, that is, the contents of the second training standard image U and the second training input image are the same, and at the same time, the quality of the second training standard image U is higher than the quality of the second training output image. For example, the second training standard image U can refer to the related description of the first training standard image X, and details are not repeated here.

It should be noted that the discriminative loss function expressed by the above formula is exemplary. For instance, the discriminative loss function can also be expressed as other commonly used formulas, and the embodiments of the present disclosure are not limited in this aspect.

For example, the training goal of the discriminative network 200 is to minimize the discriminative loss value. For instance, in the training process of the discriminative network 200, the parameters of the discriminative network 200 are continuously tuned, so that the discriminative network 200 after parameters being tuned can accurately determine the second training output image and the second training standard image, that is, the discriminative network 200 determines that the deviation between the second training output image and the second training standard image is getting larger and larger, thus continuously reducing the discriminative loss value.

It should be noted that in the present embodiment, the training of the neural network 100 and the training of the discriminative network 200 are alternately and iteratively performed. For instance, for the untrained neural network 100 and discriminative network 200, generally, the discriminative network 200 is firstly trained at a first phase to improve the discriminative ability of the discriminative network 200 and obtain the trained discriminative network 200 at the first phase; then, based on the trained discriminative network 200 at the first phase, the neural network 100 is trained at a first phase, so as to improve the image enhancement processing ability of the neural network 100 and obtain the trained neural network 100 at the first phase. Similar to the training at the first phase, in the training at a second phase, based on the trained neural network 100 at the first phase, the trained discriminative network 200 at the first phase is trained at the second phase to improve the discriminative ability of the discriminative network 200 and obtain the trained discriminative network 200 at the second phase; then, based on the trained discriminative network 200 at the second phase, the trained neural network 100 at the first phase is trained at the second phase, so as to improve the image enhancement processing ability of the neural network 100 and obtain the trained neural network 100 at the second phase; and so on. Then, the discriminative network 200 and the neural network 100 are trained at a third stage, a fourth stage, etc. until the quality of the output of the neural network 100 can be close to the quality of a corresponding training standard image.

It should be noted that in the alternate training process of the neural network 100 and the discriminative network 200, the adversarial between the neural network 100 and the discriminative network 200 is embodied in that the discriminative loss function is contrary to the generative loss function in the loss function of the neural network. It should also be noted that, ideally, the image output by the trained neural network 100 is a high-quality image (i.e., the quality of the image is close to the quality of the training standard image), and the output of the discriminative network 200 corresponding to the second training standard image and the output of the discriminative network 200 corresponding to the second training output image generated by the neural network 100 approach to the same, that is, the neural network 100 and the discriminative network 200 achieve Nash equilibrium through adversarial.

It should be noted that in the training method provided by the embodiments of the present disclosure, a large number of reading operations and decoding operations of sample images (including the first/second training input images, the first/second training standard images, etc.) in the training set are usually involved. For example, in some embodiments, the read operation refers to an operation of reading a sample image stored in a memory into a processor; and for example, in some embodiments, the decoding operation refers to an operation of decoding a sample image in a picture format (e.g., a format such as PNG, TIFF, JPEG, etc.) into a binary data format, and the sample image usually needs to be decoded before being processed by a neural network.

For a sample image with high resolution, every reading operation and decoding operation will occupy a lot of computing resources, which is not conducive to improving the training speed; and this problem is particularly serious in the case where there are a large number of sample images with high resolution. Therefore, in some embodiments, in order to solve the above problem, each sample image in the training set can be cropped and decoded in advance to obtain a plurality of sub-sample images in the binary data format, so that the neural network can be trained based on the plurality of sub-sample images in the binary data format.

For example, in some embodiments, each sample image in the training set can firstly be cropped into a plurality of sub-sample images, and then the plurality of sub-sample images can be decoded into sub-sample images in binary data format which are then stored. For example, in some other embodiments, each sample image in the training set can firstly be decoded into a sample image in binary data format, and then the sample image in the binary data format can be cropped to obtain a plurality of sub-sample images in binary data format which are then stored.

For example, the plurality of sub-sample images corresponding to each sample image may be overlapped with each other, or may not be overlapped with each other, which is not limited in the embodiments of the present disclosure. For instance, the sizes of the plurality of sub-sample images corresponding to each sample image may be completely the same, partially the same, or different from one another, which is not limited in the embodiments of the present disclosure. For instance, the centers of the plurality of sub-sample images corresponding to each sample image can be uniformly distributed or unevenly distributed, which is not limited in the embodiments of the present disclosure.

For example, the plurality of sub-sample images corresponding to the same sample image can be stored in the same storage path (such as a same folder), while sub-sample images corresponding to different sample images are stored in different storage paths. For instance, in some embodiments, each sample image corresponds to a folder, and the plurality of sub-sample images corresponding to one sample image are stored in a predetermined naming manner in the folder; at the same time, the folders corresponding to all sample images can be stored in a large folder, that is, the training set can correspond to the large folder. For instance, the sub-sample images corresponding to each sample image can be named according to a naming manner of "sample image name"+"sub-sample image serial number", and the embodiments of the present disclosure include but are not limited to this case.

For example, when training a neural network based on the plurality of sub-sample images in binary data format, a folder can be randomly read (which is equivalent to selecting a sample image), then a sub-sample image in binary data format in the folder can be randomly read, and then the sub-sample image in binary data format which has been read can be used as, for example, a training input image, or the like for training. Therefore, computing resources can be saved in the training process.

The training method of the neural network provided by the embodiments of the present disclosure can train the neural network used in the image processing method provided by the embodiments of the present disclosure, and the trained neural network obtained by using the training method can perform image enhancement processing on the input image, thereby obtaining high image fidelity, greatly improving the quality of the output image, and improving the processing speed at the same time.

Figure 11:
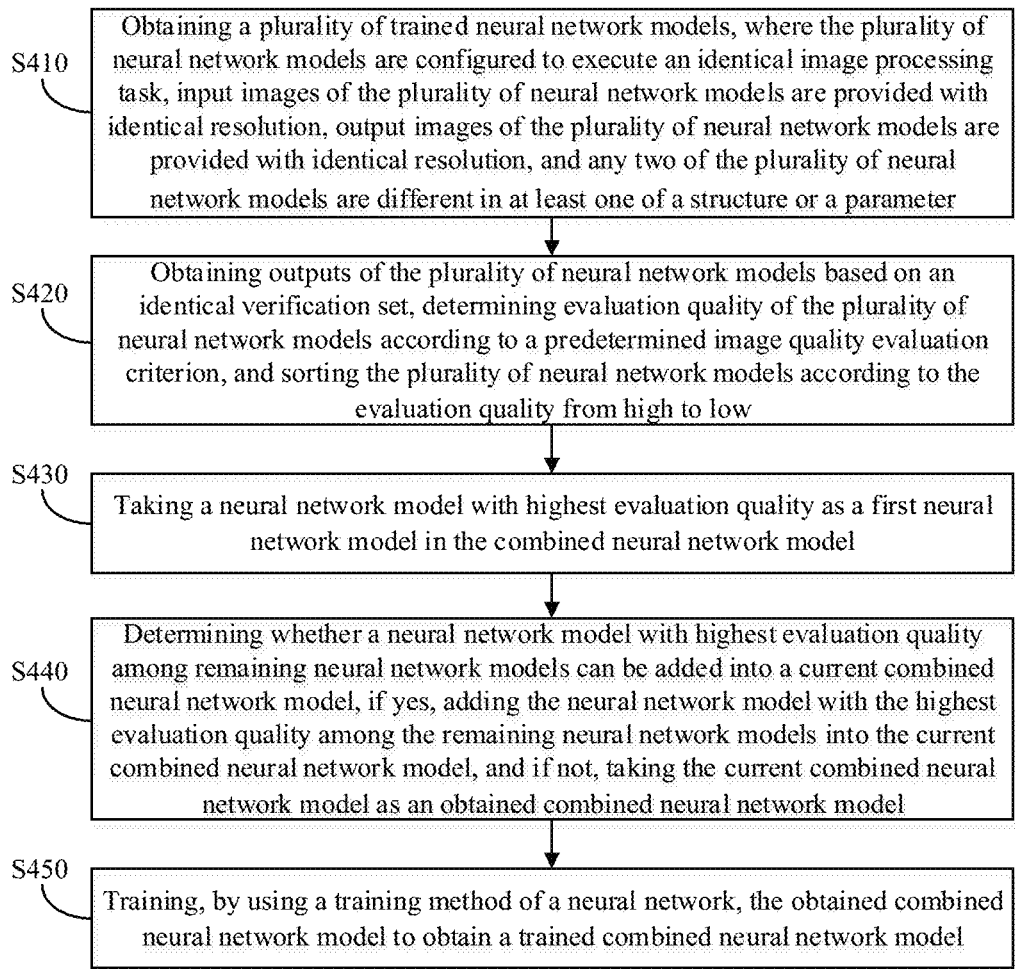
FIG. 11 is a flowchart of a constructing method of a combined neural network model provided by some embodiments of the present disclosure.

At least one embodiment of the present disclosure further provides a constructing method of a combined neural network model. FIG. 11 is a flowchart of a constructing method of a combined neural network model provided by some embodiments of the present disclosure. For instance, as illustrated in FIG. 11, the constructing method of the combined neural network model includes steps S410 to S450.

Step S410: obtaining a plurality of trained neural network models, where the plurality of neural network models are configured to execute an identical image processing task, input images of the plurality of neural network models are provided with identical resolution, output images of the plurality of neural network models are provided with identical resolution, and any two of the plurality of neural network models are different in at least one of a structure or a parameter.

For example, in step S410, the plurality of neural network models can include neural network models with the same structure but different parameters. For instance, the neural network models with the same structure but different parameters can be trained based on different training configurations. For instance, different training configurations refer to one or any combination of different training sets, different initial parameters, different convolution kernel sizes (e.g., 3*3, 5*5, 7*7, etc.), different super-parameters, etc. It should be understood that in the case where there are differences between the specific structures of the neural network models, training can be performed based on the same training configuration, which is not limited in the embodiments of the present disclosure.

For example, in some embodiments, the plurality of neural network models may include a first neural network model, and the first neural network model is configured to perform a first image processing method. For instance, the first image processing method is the image processing method provided by the aforementioned embodiments (e.g., including the above steps S110 to S140, etc.), and the embodiments of the present disclosure include but are not limited to this case.

Step S420: obtaining outputs of the plurality of neural network models based on an identical verification set, determining evaluation quality of the plurality of neural network models according to a predetermined image quality evaluation criterion, and sorting the plurality of neural network models according to the evaluation quality from high to low.

For example, in step S420, the verification set includes a verification input image and a verification standard image corresponding to the verification input image. For instance, the verification input image may refer to the related description of the aforementioned training input images (e.g., the first training input image and the second training input image), and the verification standard image may refer to the related description of the aforementioned training standard images (e.g., the first training standard image and the second training standard image), which will not be repeated here. It should be understood that there is usually no strict distinction between the verification set and the training set. For instance, in some cases, the verification set can be used as a training set, while part of the training set can be used as a verification set.

For example, in some embodiments, the above-mentioned verification input images are input into the plurality of neural network models to obtain verification output images of the plurality of neural network models, and then the evaluation quality of each neural network model is determined based on the verification output image and the verification standard image. For instance, the more similar the verification output image is to the verification standard image, the higher the evaluation quality of the neural network model. For instance, the image quality evaluation criterion includes the mean square error (MSE), similarity (SSIM), peak signal-to-noise ratio (PSNR), etc. Taking that the evaluation criterion is the mean square error as an example, the mean square error between the verification output image and the verification standard image can be calculated through the following formula:

$$MSE = E[(X'-Y')^2],$$

where MSE represents the mean square error, Y' represents the verification output image, X' represents the verification standard image corresponding to the verification output image, and E[ ] represents calculating the matrix energy.

For example, the smaller the mean square error MSE, indicating that the more similar the verification output image is to the verification standard image, that is, the higher the evaluation quality of the neural network model; the greater the mean square error MSE, indicating that the more the verification output image deviates from the verification standard image, that is, the lower the evaluation quality of the neural network model. For instance, in this case, the neural network models are sorted according to the evaluation quality from high to low, that is, the neural networks are sorted according to the mean square error from small to large.

Step S430: taking a neural network model with highest evaluation quality as a first neural network model in the combined neural network model.

For example, in some embodiments, the neural network model with the smallest mean square error can be taken as the first neural network model in the combined neural network model, and the embodiments of the present disclosure include but are not limited to this case. For example, in some other embodiments, the neural network model with the greatest PSNR can be taken as the first neural network model in the combined neural network model.

Step S440: determining whether a neural network model with highest evaluation quality among remaining neural network models can be added into a current combined neural network model, if yes, adding the neural network model with the highest evaluation quality among the remaining neural network models into the current combined neural network model, and if not, taking the current combined neural network model as an obtained combined neural network model.

For example, in one aspect, the verification input image can be input into the neural network models in the current combined neural network model to obtain the outputs of the neural network models in the current combined neural network model; then, the outputs of the neural network models in the current combined neural network model are averaged to obtain the output of the current combined neural network model, and the evaluation quality of the current combined neural network model is determined based on the output of the current combined neural network model. In another aspect, the verification input image can be input into the current remaining neural network model (the current remaining neural network model refers to a neural network model that has not been combined into the combined neural network model) with the highest evaluation quality, so as to obtain the output of the current remaining neural network model with the highest evaluation quality; then, the output of the current remaining neural network model with the highest evaluation quality and the outputs of the neural network models in the current combined neural network model are averaged to obtain the output of a temporary combined neural network model, and the evaluation quality of the temporary combined neural network model is determined based on the output of the temporary combined neural network model. If the evaluation quality of the temporary combined neural network model is not lower than the evaluation quality of the current combined neural network model, the current remaining neural network model with the highest evaluation quality is added into the current combined neural network model, and then it continues to judge the remaining neural network model with the highest evaluation quality; and if the evaluation quality of the temporary combined neural network model is lower than the evaluation quality of the current combined neural network model, step S440 is ended.

It should be understood that in the case where the combined neural network model only includes the first neural network model, the output of the first neural network model is directly taken as the output of the combined neural network model. It should also be understood that if the plurality of neural network models obtained in step S410 are all added into the combined neural network model, step S440 will naturally end.

Step S450: training, by using a training method of a neural network, the obtained combined neural network model to obtain a trained combined neural network model.

For example, training the obtained combined neural network model means training the neural network models in the obtained combined neural network model at the same time. The specific training procedure can refer to the related description of the training method of the neural network mentioned above, and details will not be repeated here.

It should be understood that in the constructing method of the combined neural network model provided by the embodiments of the present disclosure, it is not required that the specific structures, processing procedures, and details of the neural network models are completely the same. For instance, for neural network models which perform the same image processing task and have other specific structures (in this case, there is no requirement for whether the training configurations are the same), if the sizes of input and output thereof are the same as the sizes of input and output of the plurality of neural network models mentioned above, they can be incorporated into the existing combined neural network model by means of adding or replacing (e.g., in replace of a model with poor performance), as long as they can make the new combined neural network model have higher evaluation quality.

Technical effects of the constructing method of the combined neural network model provided by the embodiments of the present disclosure can refer to the corresponding description of the image processing method based on the combined neural network model in the above embodiments, and details will not be repeated here.

Figure 12A:
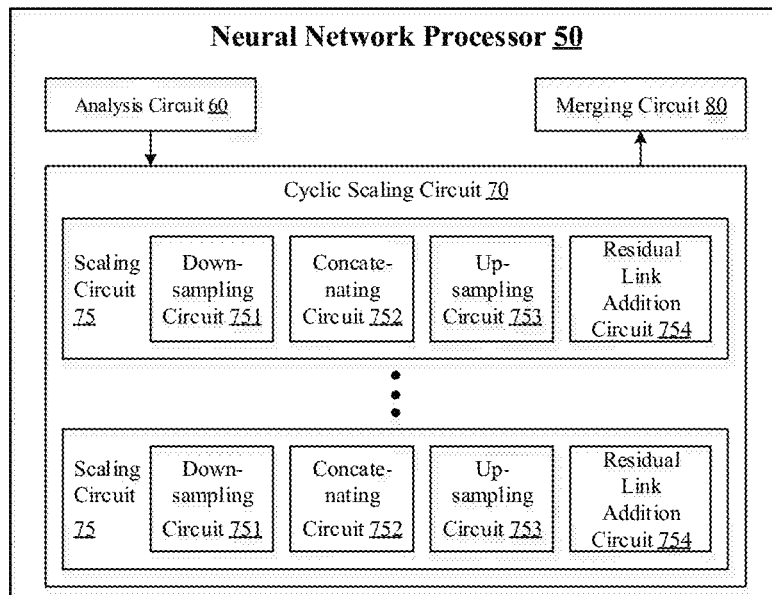
FIG. 12A is a schematic block diagram of a neural network processor provided by some embodiments of the present disclosure.

At least one embodiment of the present disclosure further provides a neural network processor. FIG. 12A is a schematic block diagram of a neural network processor provided by some embodiments of the present disclosure. For instance, as illustrated in FIG. 12A, the neural network processor 50 includes an analysis circuit 60, a cyclic scaling circuit 70, and a merging circuit 80. For instance, the neural network processor 50 can be configured to execute the aforementioned image processing method.

For instance, the analysis circuit 60 is configured to obtain, based on an input image, initial feature images of N stages with resolutions from high to low, where N is a positive integer and N>2. That is, the analysis circuit 60 can be configured to execute step S120 of the aforementioned image processing method. The specific procedure and details can refer to the aforementioned related description, and details will not be repeated here.

For instance, the cyclic scaling circuit 70 is configured to perform, based on initial feature images of second to N-th stages, cyclic scaling processing on an initial feature image of a first stage, to obtain an intermediate feature image. That is, the cyclic scaling circuit 70 can be configured to execute step S130 of the aforementioned image processing method.

The specific procedure and details can refer to the aforementioned related description, and details will not be repeated here.

For instance, the merging circuit 80 is configured to perform merging processing on the intermediate feature image to obtain an output image. That is, the merging circuit 80 can be configured to execute step S140 of the aforementioned image processing method. The specific procedure and details can refer to the aforementioned related description, and details will not be repeated here.

For instance, as illustrated in FIG. 12A, the cyclic scaling circuit 70 can include scaling circuits 75 of N−1 stages which are hierarchically nested, and the scaling circuit 75 of each stage includes a down-sampling circuit 751, a concatenating circuit 752, an up-sampling circuit 753, and a residual link addition circuit 754, so that the cyclic scaling circuit 70 can be configured to perform the cyclic scaling processing in the aforementioned image processing method. For instance, a down-sampling circuit of an i-th stage performs, based on an input of a scaling circuit of the i-th stage, down-sampling to obtain a down-sampling output of the i-th stage, a concatenating circuit of the i-th stage performs, based on the down-sampling output of the i-th stage and an initial feature image of an (i+1)-th stage, concatenating to obtain a concatenating output of the i-th stage, an up-sampling circuit of the i-th stage obtains an up-sampling output of the i-th stage based on the concatenating output of the i-th stage, and a residual link addition circuit of the i-th stage performs residual link addition between the input of the scaling circuit of the i-th stage and the up-sampling output of the i-th stage, to obtain an output of the scaling circuit of the i-th stage, where i=1, 2, . . . , N−1; and a scaling circuit of a (j+1)-th stage is nested between a down-sampling circuit of a j-th stage and a concatenating circuit of the j-th stage, and an output of the down-sampling circuit of the j-th stage serves as an input of the scaling circuit of the (j+1)-th stage, where j=1, 2, . . . , N−2.

Figure 12B:
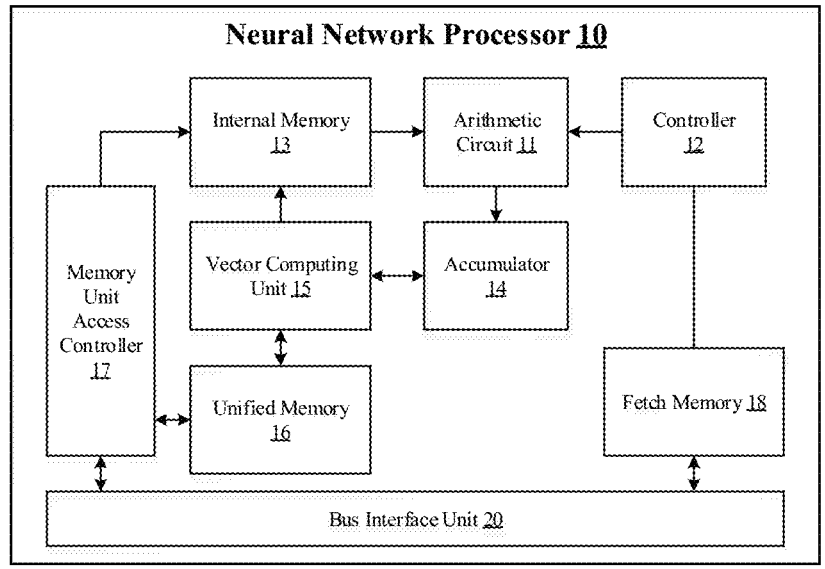
FIG. 12B is a schematic block diagram of another neural network processor provided by some embodiments of the present disclosure.

FIG. 12B is a schematic block diagram of another neural network processor provided by some embodiments of the present disclosure. For instance, the algorithm of each stage in the convolutional neural network shown in, for example, FIG.3A and/or FIG. 3B, etc., can be implemented in the neural network processor 10 shown in FIG. 12B.

For instance, the neural network processor (NPU) 10 can be mounted on a host CPU (not shown in FIG. 12B) as a coprocessor, and the host CPU assigns tasks. The core part of the NPU is an arithmetic circuit 11, and a controller 12 controls the arithmetic circuit 11 to extract data (e.g., an input matrix, a weight matrix, etc.) from an internal memory 13 and to perform operations.

For instance, in some embodiments, the arithmetic circuit 11 can include a plurality of processing engines (PEs). For instance, in some embodiments, the arithmetic circuit 11 is a two-dimensional pulse array. The arithmetic circuit 11 can also be a one-dimensional pulse array or any other electrical circuit capable of performing mathematical operations such as multiplication, addition, etc. For instance, in some embodiments, the arithmetic circuit 11 is a general-purpose matrix processor.

For instance, in some embodiments, the arithmetic circuit 11 can read the corresponding data of the weight matrix from the internal memory 13 and cache it on each PE in the arithmetic circuit 11. In addition, the arithmetic circuit 11 can also read the data of the input matrix from the internal memory 13 and perform the matrix operation on the input matrix and the weight matrix, and the partial or final result of the obtained matrix is stored in an accumulator 14.

For instance, a vector computing unit 15 can perform a further process, such as the vector multiplication, vector addition, exponential operation, logarithmic operation, magnitude comparison, etc., on the output of the arithmetic circuit 11. For instance, the vector computing unit 15 can be used for network calculation of a non-convolutional layer/non-fully connected layer in the neural network, such as down-sampling, normalization, etc.

For instance, in some embodiments, the vector computing unit 15 can store a vector of the processed output into a unified memory 16. For instance, the vector computing unit 15 can apply a nonlinear function onto the output of the arithmetic circuit 11, such as a vector of accumulated values, so as to generate an activation value. For instance, in some embodiments, the vector computing unit 15 generates a normalized value, a combined value, or both. For instance, in some embodiments, the vector of the processed output can be used as an activation input of the arithmetic circuit 11, and for example, may be used in a subsequent stage in the convolutional neural network.

Part or all of the steps of the image processing method and the training method of the neural network provided by the embodiments of the present disclosure can be executed by the arithmetic circuit 11 or the vector computing unit 15.

For instance, the neural network processor 10 can write input data or the like from an external memory (not shown in FIG. 12B) into the internal memory 13 and/or the unified memory 16 through a memory unit access controller 17, and can also store the data from the unified memory 16 into the external memory.

For instance, a bus interface unit 20 is configured to realize the interactions among the host CPU, the memory unit access controller 17, and a fetch memory 18 through the bus. For instance, the fetch memory 18 connected to the controller 12 is configured to store instructions used by the controller 12. For instance, the controller 12 is configured to call the instructions cached in the fetch memory 18 to control the operation procedure of the arithmetic circuit 11.

For instance, the operation of each stage in the convolutional neural network shown in FIG. 3A and/or FIG. 3B can be performed by the arithmetic circuit 11 or the vector computing unit 15.

Figure 13A:
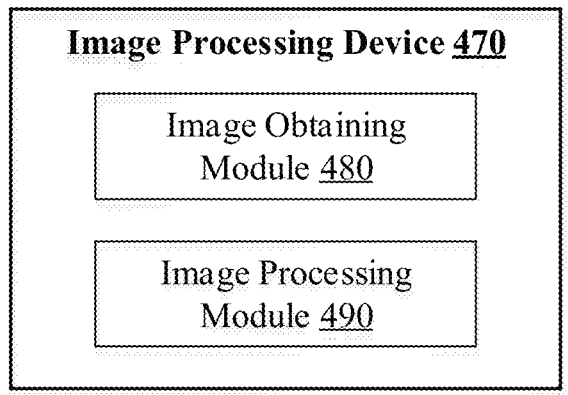
FIG. 13A is a schematic block diagram of an image processing device provided by some embodiments of the present disclosure.

At least one embodiment of the present disclosure further provides an image processing device. FIG. 13A is a schematic block diagram of an image processing device provided by some embodiments of the present disclosure. For instance, as illustrated in FIG. 13A, the image processing device 470 includes an image obtaining module 480 and an image processing module 490.

For instance, the image processing device 470 can be configured to execute the image processing method described above, and the embodiments of the present disclosure include but are not limited to this case.

For instance, the image obtaining module 480 can be configured to execute step S110 of the aforementioned image processing method, and the embodiments of the present disclosure include but are not limited to this case. For instance, the image obtaining module 480 can be configured to obtain an input image. For instance, the image obtaining module 480 can include a memory, and the memory stores the input image; alternatively, the image obtaining module 480 can also include one or more cameras for acquiring an input image.

For instance, the image processing module 490 can be configured to execute steps S120 to S140 of the aforementioned image processing method, and the embodiments of the present disclosure include but are not limited to this case. For instance, the image processing module can be configured to: obtain, based on the input image, initial feature images of N stages with resolutions from high to low, where N is a positive integer and N>2; perform, based on initial feature images of second to N-th stages, cyclic scaling processing on an initial feature image of a first stage, to obtain an intermediate feature image; and perform merging processing on the intermediate feature image to obtain an output image. For instance, the specific procedure and details of the cyclic scaling processing can refer to the related description of the aforementioned image processing method, and details will not be repeated here.

For instance, in some embodiments, the image obtaining module 480 and the image processing module 490 can be implemented as hardware, software, firmware, or any feasible combination thereof.

Figure 13B:
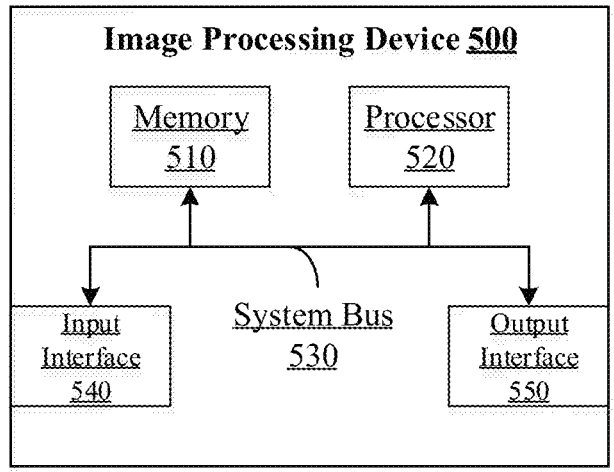
FIG. 13B is a schematic block diagram of another image processing device provided by some embodiments of the present disclosure.

FIG. 13B is a schematic block diagram of another image processing device provided by some embodiments of the present disclosure. For instance, as illustrated in FIG. 13B, the image processing device 500 includes a memory 510 and a processor 520. For instance, the memory 510 is configured to store computer readable instructions non-transitorily, and the processor 520 is configured to execute the computer readable instructions. Upon the computer readable instructions being executed by the processor 520, the image processing method or/and the image processing method based on the combined neural network model or/and the training method of the neural network or/and the constructing method of the combined neural network model provided by any embodiment of the present disclosure can be executed.

For instance, the memory 510 and the processor 520 can communicate with each other directly or indirectly. For instance, in some examples, as illustrated in FIG. 13B, the data processing device 500 can further include a system bus 530, and the memory 510 and the processor 520 can communicate with each other through the system bus 530. For instance, the processor 520 can access the memory 510 through the system bus 530. For instance, in some other examples, components such as the memory 510 and the processor 520 can communicate with each other via network connection. The network can include a wireless network, a wired network, and/or any combination of the wireless network and the wired network. The network may include local area network (LAN), the Internet, a telecommunication network, Internet of Things based on the Internet and/or the telecommunication network, and/or any combination of the above networks, etc. The wired network, for example, can communicate by means of the twisted pair, coaxial cable, optical fiber transmission, or the like. The wireless network, for example, can adopt a communication mode such as 3G/4G/5G mobile communication network, Bluetooth, Zigbee, WiFi, or the like. The present disclosure does not limit the type and function of the network.

For instance, the processor 520 can control other components in the image processing device to realize desired functions. The processor 520 can be an element having data processing capability and/or program execution capability, such as a central processing unit (CPU), a tensor processing unit (TPU), or a graphics processing unit (GPU). The CPU can have an X86 or ARM architecture, etc. The GPU can be integrated directly on the motherboard alone or built into the Northbridge chip of the motherboard. The GPU can also be built into the CPU.

For instance, the memory 510 can include one or more computer program products, and the computer program products can include a computer readable storage medium of diverse forms, such as a volatile memory and/or a non-volatile memory. The volatile memory, for example, can include a random access memory (RAM) and/or a cache, etc. The non-volatile memory, for example, can include a read-only memory (ROM), a hard disk, an erasable programmable read-only memory (EPROM), a portable compact disk read-only memory (CD-ROM), a USB memory, a flash memory, etc.

For instance, one or more computer instructions can be stored on the memory 510, and the processor 520 can execute the computer instructions to realize various functions. The computer readable storage medium can also store various applications and various data, such as the input image, the output images, the first/second training input image, the first/second training output image, the first/second training standard image, and various data used and/or generated by the applications.

For instance, in the case where some computer instructions stored on the memory 510 are executed by the processor 520, one or more steps in the image processing method or the image processing method based on the combined neural network model described above can be executed. Moreover, for instance, in the case where some other computer instructions stored on the memory 510 are executed by the processor 520, one or more steps in the training method of the neural network or the constructing method of the combined neural network model described above can be executed.

For instance, as illustrated in FIG. 13B, the image processing device 500 can further include an input interface 540 that allows an external device to communicate with the image processing device 500. For instance, the input interface 540 can be configured to receive instructions from an external computer device, a user, etc. The image processing device 500 can further include an output interface 550 that allows the image processing device 500 to be connected with one or more external devices. For instance, the image processing device 500 can display images or the like through the output interface 550. The external devices which communicate with the image processing device 500 through the input interface 540 and/or the output interface 550 can be included in an environment that provides a user interface of any type with which the user can interact with the external devices. Examples of the types of user interfaces include the graphical user interface (GUI), natural user interface, etc. For example, the GUI can receive an input from a user via an input device such as a keyboard, a mouse, a remote controller, or the like, and can provide an output on an output device such as a display. In addition, the natural user interface can enable a user to interact with the image processing device 500 in a manner that is not constrained by input devices such as a keyboard, a mouse, a remote controller, or the like. In contrast, the natural user interface can rely on voice recognition, touch and stylus recognition, gesture recognition on and near the screen, aerial gesture, head and eye tracking, speech and semantics, vision, touch, gesture, machine intelligence, etc.

Moreover, although the image processing device 500 is shown as an individual system in FIG. 13B, it should be understood that the image processing device 500 can also be a distributed system and can also be deployed as a cloud facility (including public cloud or private cloud). Thus, for example, a plurality of devices can communicate with each other via network connection and execute the tasks which are described to be executed by the image processing device 500 together.

For instance, the detailed description of the processing procedure of the image processing method can refer to the related descriptions in the above-mentioned embodiments of the image processing method, the detailed description of the processing procedure of the image processing method based on the combined neural network model can refer to the related descriptions in the above-mentioned embodiments of the image processing method based on the combined neural network model, the detailed description of the processing procedure of the training method of the neural network can refer to the related descriptions in the above-mentioned embodiments of the training method of the neural network, and the detailed description of the processing procedure of the constructing method of the combined neural network model can refer to the related descriptions in the above-mentioned embodiments of the constructing method of the combined neural network model. No further description will be given here.

It should be noted that the image processing device provided by the embodiments of the present disclosure is exemplary, not restrictive, and the image processing device may further include other conventional components or structures according to the actual application requirements. For instance, in order to realize the necessary functions of the image processing device, those skilled in the art may set other conventional components or structures according to specific application scenarios, and the embodiments of the present disclosure are not limited to this case.

Technical effects of the image processing device provided by the embodiments of the present disclosure can refer to the corresponding descriptions of the image processing method, the image processing method based on the combined neural network model, the training method of the neural network, and the constructing method of the combined neural network model in the above embodiments, and details will not be repeated here.

Figure 14:
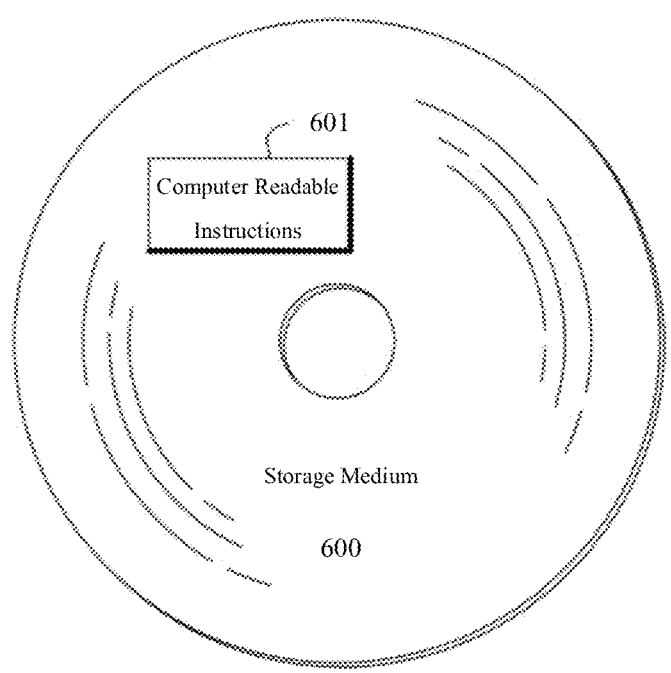
FIG. 14 is a schematic diagram of a storage medium provided by some embodiments of the present disclosure.

At least one embodiment of the present disclosure further provides a storage medium. FIG. 14 is a schematic diagram of a storage medium provided by an embodiment of the present disclosure. For instance, as illustrated in FIG. 14, the storage medium 600 is configured to store computer readable instructions 601 non-transitorily. Upon the non-transitory computer readable instructions 601 being executed by a computer (including a processor), instructions of the image processing method or the image processing method based on the combined neural network model provided by any embodiment of the present disclosure can be executed, or instructions of the training method of the neural network or the constructing method of the combined neural network model provided by any embodiment of the present disclosure can be executed.

For instance, one or more computer instructions can be stored on the storage medium 600. Some computer instructions stored on the storage medium 600 can be, for example, instructions for implementing one or more steps in the image processing method or the image processing method based on the combined neural network model described above. Some other computer instructions stored on the storage medium 600 can be, for example, instructions for implementing one or more steps in the training method of the neural network or the constructing method of the combined neural network model described above.

For instance, the storage medium can include a storage component of a tablet computer, a hard disk of a personal computer, a random access memory (RAM), a read-only memory (ROM), an erasable programmable read-only memory (EPROM), a portable compact disk read-only memory (CD-ROM), a flash memory, or any combination of the above-mentioned storage media, or other suitable storage medium.

Technical effects of the storage medium provided by the embodiments of the present disclosure can refer to the corresponding descriptions of the image processing method, the image processing method based on the combined neural network model, the training method of the neural network, and the constructing method of the combined neural network model in the above embodiments, and details will not be repeated here.

For the present disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above merely are specific implementations of the present disclosure, and the protection scope of the present disclosure is not limited thereto. Any modifications or substitutions that easily occur to those skilled in the art within the technical scope of the present disclosure should be within the protection scope of the present disclosure. Therefore, the protection scope of the present disclosure should be based on the protection scope of the claims.

What is claimed is:

1. An image processing method, comprising:
obtaining an input image;
obtaining, based on the input image, initial feature images of N stages with resolutions from high to low, wherein N is a positive integer and N>2;
performing, based on initial feature images of second to N-th stages, cyclic scaling processing on an initial feature image of a first stage, to obtain an intermediate feature image; and
performing merging processing on the intermediate feature image to obtain an output image,
wherein the cyclic scaling processing comprises hierarchically-nested scaling processing of N−1 stages, and scaling processing of each stage comprises down-sampling processing, concatenating processing, up-sampling processing, and residual link addition processing;
down-sampling processing of an i-th stage performs, based on an input of scaling processing of the i-th stage, down-sampling to obtain a down-sampling output of the i-th stage,
concatenating processing of the i-th stage performs, based on the down-sampling output of the i-th stage and an initial feature image of an (i+1)-th stage, concatenating to obtain a concatenating output of the i-th stage,
up-sampling processing of the i-th stage obtains an up-sampling output of the i-th stage based on the concatenating output of the i-th stage, and
residual link addition processing of the i-th stage performs residual link addition between the input of the scaling processing of the i-th stage and the up-sampling output of the i-th stage, to obtain an output of the scaling processing of the i-th stage, wherein i=1, 2, . . . , N−1; and
scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, wherein j=1, 2, . . . , N−2,
wherein the obtaining, based on the input image, the initial feature images of the N stages with resolutions from high to low, comprises:
concatenating the input image with a random noise image to obtain a concatenating input image; and
performing analysis processing of N different stages on the concatenating input image, to obtain the initial feature images of the N stages with resolutions from high to low, respectively.

2. The image processing method according to claim 1, wherein the concatenating processing of the i-th stage performing, based on the down-sampling output of the i-th stage and the initial feature image of the (i+1)-th stage, concatenating to obtain the concatenating output of the i-th stage, comprises:
taking the down-sampling output of the i-th stage as an input of scaling processing of the (i+1)-th stage, to obtain an output of the scaling processing of the (i+1)-th stage; and
concatenating the output of the scaling processing of the (i+1)-th stage with the initial feature image of the (i+1)-th stage to obtain the concatenating output of the i-th stage.

3. The image processing method according to claim 2, wherein scaling processing of at least one stage is continuously performed a plurality of times, and an output of a former scaling processing serves as an input of a latter scaling processing.

4. The image processing method according to claim 3, wherein the scaling processing of each stage is continuously performed twice.

5. The image processing method according to claim 1, wherein among the initial feature images of the N stages, resolution of the initial feature image of the first stage is provided with a highest value, and the resolution of the initial feature image of the first stage is identical to resolution of the input image.

6. The image processing method according to claim 1, wherein resolution of an initial feature image of a former stage is an integer multiple of resolution of an initial feature image of a latter stage.

7. The image processing method according to claim 1, wherein obtaining the input image comprises:
obtaining an original input image with first resolution; and
performing resolution conversion processing on the original input image to obtain the input image with second resolution, wherein the second resolution is greater than the first resolution.

8. The image processing method according to claim 7, wherein the resolution conversion processing is performed by using one selected from a group consisting of a bicubic interpolation algorithm, a bilinear interpolation algorithm, and a Lanczos interpolation algorithm.

9. The image processing method according to claim 1, further comprising:
performing crop processing on the input image to obtain a plurality of sub-input images with an overlapping region;
obtaining, based on the input image, the initial feature images of the N stages with resolutions from high to low, comprises:

obtaining, based on each of the sub-input images, sub-initial feature images of N stages with resolutions from high to low, wherein N is a positive integer and N>2;

performing, based on the initial feature images of the second to N-th stages, the cyclic scaling processing on the initial feature image of the first stage to obtain the intermediate feature image, comprises:

performing, based on sub-initial feature images of second to N-th stages, cyclic scaling processing on a sub-initial feature image of a first stage, to obtain a sub-intermediate feature image; and performing the merging processing on the intermediate feature image to obtain the output image, comprises:

performing merging processing on the sub-intermediate feature image to obtain a corresponding sub-output image, and stitching sub-output images corresponding to the plurality of sub-input images into the output image.

10. The image processing method according to claim 9, wherein the plurality of sub-input images are identical in size, centers of the plurality of sub-input images form a uniform and regular grid, an overlapping region of two adjacent sub-input images is provided with a constant size in both a row direction and a column direction, and a pixel value of each pixel point in the output image is expressed as:

$$Y_p = \frac{1}{\sum_{k=1}^{T} s_k} \sum_{k=1}^{T} s_k Y_{k,(p)},$$

wherein $Y_p$ represents a pixel value of any pixel point p in the output image, T represents a count of sub-output images comprising the pixel point p, $Y_{k,(p)}$ represents a pixel value of the pixel point p in a k-th sub-output image comprising the pixel point p, and $S_k$ represents a distance between the pixel point p in the k-th sub-output image comprising the pixel point p, and a center of the k-th sub-output image comprising the pixel point p.

11. An image processing device, comprising:
a memory, configured for non-transitory storage of computer readable instructions; and
a processor, configured to execute the computer readable instructions,
herein upon the computer readable instructions being executed by the processor, the image processing method according to claim 1 is executed.

12. A storage medium, configured for non-transitory storage of computer readable instructions, wherein upon the computer readable instructions being executed by a computer, instructions of the image processing method according to claim 1 can be executed.

13. An image processing method based on a combined neural network model, wherein the combined neural network model comprises a plurality of neural network models, the plurality of neural network models are configured to execute an identical image processing task, input images of the plurality of neural network models are provided with identical resolution, output images of the plurality of neural network models are provided with identical resolution, and any two of the plurality of neural network models are different in at least one of a structure or a parameter; and the image processing method based on the combined neural network model comprises:

inputting an input image into the plurality of neural network models in the combined neural network model, to obtain outputs of the plurality of neural network models, respectively; and averaging the outputs of the plurality of neural network models to obtain an output of the combined neural network model, wherein the plurality of neural network models comprise a first neural network model, the first neural network model is configured to perform a first image processing method, and the first image processing method comprises:

obtaining an input image;

obtaining, based on the input image, initial feature images of N stages with resolutions from high to low, wherein N is a positive integer and N>2;

performing, based on initial feature images of second to N-th stages, cyclic scaling processing on an initial feature image of a first stage, to obtain an intermediate feature image; and performing merging processing on the intermediate feature image to obtain an output image, wherein the cyclic scaling processing comprises hierarchically-nested scaling processing of N−1 stages, and scaling processing of each stage comprises down-sampling processing, concatenating processing, up-sampling processing, and residual link addition processing;

down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, wherein i=1, 2, . . . , N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, wherein j=1, 2, . . . , N−2.

wherein the obtaining, based on the input image, the initial feature images of the N stages with resolutions from high to low, comprises:

concatenating the input image with a random noise image to obtain a concatenating input image; and performing analysis processing of N different stages on the concatenating input image, to obtain the initial feature images of the N stages with resolutions from high to low, respectively.

14. A constructing method of a combined neural network model, comprising:

obtaining a plurality of trained neural network models, wherein the plurality of neural network models are configured to execute an identical image processing task, input images of the plurality of neural network models are provided with identical resolution, output images of the plurality of neural network models are provided with identical resolution, and any two of the plurality of neural network models are different in at least one of a structure or a parameter;

obtaining outputs of the plurality of neural network models based on an identical verification set, determining evaluation quality of the plurality of neural network models according to a predetermined image quality evaluation criterion, and sorting the plurality of neural network models according to the evaluation quality from high to low;

taking a neural network model with highest evaluation quality as a first neural network model in the combined neural network model; and determining whether a neural network model with highest evaluation quality among remaining neural network models can be added into a current combined neural network model, if yes, adding the neural network model with the highest evaluation quality among the remaining neural network models into the current combined neural network model, and if not, taking the current combined neural network model as an obtained combined neural network model, wherein the plurality of neural network models comprise a first neural network model, the first neural network model is configured to perform a first image processing method, and the first image processing method comprises:

obtaining an input image;

obtaining, based on the input image, initial feature images of N stages with resolutions from high to low, wherein N is a positive integer and N>2;

performing, based on initial feature images of second to N-th stages, cyclic scaling processing on an initial feature image of a first stage among the initial feature images of the N stages, to obtain an intermediate feature image; and performing merging processing on the intermediate feature image to obtain an output image, wherein the cyclic scaling processing comprises hierarchically-nested scaling processing of N−1 stages, and scaling processing of each stage comprises down-sampling processing, concatenating processing, up-sampling processing, and residual link addition processing;

down-sampling processing of an i-th stage performs, based on an input of scaling processing of the i-th stage, down-sampling to obtain a down-sampling output of the i-th stage, concatenating processing of the i-th stage performs, based on the down-sampling output of the i-th stage and an initial feature image of an (i+1)-th stage, concatenating to obtain a concatenating output of the i-th stage, up-sampling processing of the i-th stage obtains an up-sampling output of the i-th stage based on the concatenating output of the i-th stage, and residual link addition processing of the i-th stage performs residual link addition between the input of the scaling processing of the i-th stage and the up-sampling output of the i-th stage, to obtain an output of the scaling processing of the i-th stage, wherein i=1, 2, ..., N−1; and scaling processing of a (j+1)-th stage is nested between down-sampling processing of a j-th stage and concatenating processing of the j-th stage, and an output of the down-sampling processing of the j-th stage serves as an input of the scaling processing of the (j+1)-th stage, wherein j=1, 2, ..., N−2, wherein the obtaining, based on the input image, the initial feature images of the N stages with resolutions from high to low, comprises:

concatenating the input image with a random noise image to obtain a concatenating input image; and performing analysis processing of N different stages on the concatenating input image, to obtain the initial feature images of the N stages with resolutions from high to low, respectively.

15. The constructing method of the combined neural network model according to claim 14, further comprising:
training the obtained combined neural network model to obtain a trained combined neural network model.

16. The constructing method of the combined neural network model according to claim 14, wherein the predetermined image quality evaluation criterion comprises one selected from a group consisting of a mean square error, similarity, and a peak signal-to-noise ratio.

\* \* \* \* \*